United States Patent
Kim et al.

(10) Patent No.: US 12,207,333 B2
(45) Date of Patent: Jan. 21, 2025

(54) METHOD AND APPARATUS FOR HANDLING SECURITY INFORMATION BETWEEN A WIRELESS DEVICE AND A NETWORK FOR A FAST RRC RELEASE PROCEDURE IN A WIRELESS COMMUNICATION SYSTEM

(71) Applicant: LG ELECTRONICS INC., Seoul (KR)

(72) Inventors: Seokjung Kim, Seoul (KR); Hyunjung Choe, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 515 days.

(21) Appl. No.: 17/619,021

(22) PCT Filed: Jan. 16, 2020

(86) PCT No.: PCT/KR2020/000789
§ 371 (c)(1),
(2) Date: Dec. 14, 2021

(87) PCT Pub. No.: WO2021/025246
PCT Pub. Date: Feb. 11, 2021

(65) Prior Publication Data
US 2022/0304093 A1    Sep. 22, 2022

(30) Foreign Application Priority Data
Aug. 6, 2019 (KR) .................. 10-2019-0095750

(51) Int. Cl.
*H04W 76/19* (2018.01)
*H04W 12/0471* (2021.01)
*H04W 76/30* (2018.01)

(52) U.S. Cl.
CPC ....... *H04W 76/19* (2018.02); *H04W 12/0471* (2021.01); *H04W 76/30* (2018.02)

(58) Field of Classification Search
CPC ................. H04W 76/19; H04W 76/30; H04W 12/0471
See application file for complete search history.

(56) References Cited

U.S. PATENT DOCUMENTS

| | | | |
|---|---|---|---|
| 2018/0324869 A1* | 11/2018 | Phuyal | H04W 74/0833 |
| 2021/0067966 A1* | 3/2021 | Teyeb | H04W 76/27 |
| 2022/0159518 A1* | 5/2022 | Da Silva | H04W 76/10 |

FOREIGN PATENT DOCUMENTS

| | | |
|---|---|---|
| WO | 2019-032222 A1 | 2/2019 |
| WO | 2019-062875 A1 | 4/2019 |

OTHER PUBLICATIONS

Qualcomm Incorporated et al., "MO UP Early data Transmission, S2-1908427, 3GPP TSG-SA WG2 Meeting #134", Sapporo, Japan, Jun. 27, 2019, Sections 4.8.2.3-4.8.2.X, and Figures 4.8.2.3-1, 4.8.2.X-1.

(Continued)

*Primary Examiner* — Yemane Mesfin
*Assistant Examiner* — Salma Ayad
(74) *Attorney, Agent, or Firm* — BRYAN CAVE LEIGHTON PAISNER LLP

(57) ABSTRACT

A method and apparatus for handling security information between a wireless device and a network for a fast RRC release procedure in a wireless communication system will be provided. A core network node in a wireless communication system receives, from a radio access network (RAN) node, a UE context resume request message including a fast Radio Resource Control (RRC) release indication. The fast RRC release indication informs that the RAN node transmits an RRC release message to a wireless device before the core network node receives the UE context resume request message. A core network node determines to stop computation (Continued)

of new security information for the wireless device based on the fast RRC release indication. A core network node transmits a UE context resume response message to the RAN node.

14 Claims, 26 Drawing Sheets

(56) References Cited

OTHER PUBLICATIONS

Ericsson, "MO EDT for UP Optimization, S2-1907485, 3GPP TSG-SA WG2 Meeting #134", Sapporo, Japan, Jun. 18, 2019, Section 5.3.5A, and Figure 5.3.5A-1.
Futurewei, "Evaluation of Solution #4, S3-191811, 3GPP TSG-SA WG3 Meeting #95-BIS", Sapporo, Japan, Jun. 14, 2019, Section 4.
"3rd Generation Partnership Project;Technical Specification Group Services and System Aspects;Procedures for the 5G System; Stage 2 (Release 16)", 3GPP TS 23.502 V16.1.1, Jun. 2019, pp. 1-495.
"3rd Generation Partnership Project; Technical Specification Group Services and System Aspects; Security Architecture and Procedures for 5G System (Release 15)", 3GPP TS 33.501 V15.5.0, Jun. 2019, pp. 1-190.
"3rd Generation Partnership Project; Technical Specification Group Radio Access Network; NR; NR and NG-RAN Overall Description; Stage 2 (Release 15)", 3GPP TS 38.300 V15.6.0, Jun. 2019, pp. 1-99.

* cited by examiner

METHOD AND APPARATUS FOR HANDLING SECURITY INFORMATION BETWEEN A WIRELESS DEVICE AND A NETWORK FOR A FAST RRC RELEASE PROCEDURE IN A WIRELESS COMMUNICATION SYSTEM

CROSS-REFERENCE TO RELATED APPLICATIONS

This application is the National Stage filing under 35 U.S.C. § 371 of International Application No. PCT/KR2020/000789, filed on Jan. 16, 2020, and claims priority to and the benefits of Korean Application No. 10-2019-0095750, filed on Aug. 6, 2019, all of which are incorporated by reference in their entirety herein.

TECHNICAL FIELD

The present disclosure relates to a method and apparatus for handling security information between a wireless device and a network for a fast RRC release procedure in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in an international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Radio resource control (RRC) inactive state (or RRC idle state with suspend) is a new state added in 5G NR compare to 4G LTE. Motivation to use this state seems to reduce the time to bring user equipment (UE) in connected state from other states. This will increase UE battery life and latency as well because of less signaling involved. Both UE and gNB stores access stratum (AS) context in this state and bringing to RRC connected state from inactive state would not involve NAS level signaling.

SUMMARY

Fast RRC release procedure has been studied for returning a wireless device to the RRC inactive state (or RRC idle state with Suspend) as soon as possible. In the fast RRC release procedure, a radio access network (RAN) node may transmit, to a wireless device, a RRC release message before transmitting a message related to the fast RRC release procedure to a core network node.

However, security information in the RAN node and the core network node could be changed, from old security information to new security information, after the RRC release message is transmitted to the wireless device. In this case, the RAN node could not transmit the new security information to the wireless device. The wireless device has only the old security information, but does not have the new security information.

When the wireless device transmits uplink (UL) data via early data transmission (EDT) procedure, the UL data may be ciphered by the old security information. However, the RAN node may try to decipher the UL data with the new security information and could be failed to decipher the UL data.

To avoid this problem, studies for handling the security information between a wireless device and a network for a fast RRC release procedure are needed.

In an aspect, a method performed by a core network node in a wireless communication system is provided. The core network node receives, from a radio access network (RAN) node, a UE context resume request message including a fast Radio Resource Control (RRC) release indication. The fast RRC release indication informs that the RAN node transmits an RRC release message to a wireless device before the core network node receives the UE context resume request message. The core network node determines to stop computation of new security information for the wireless device based on the fast RRC release indication. The core network node transmits a UE context resume response message to the RAN node.

In another aspect, a method performed by a radio access network (RAN) node in a wireless communication system is provided. The RAN node transmits, to a wireless device, old security information. The RAN node transmits, to a core network node, a UE context resume request message including a fast RRC release indication after transmitting an RRC release message to the wireless device. The RAN node receives uplink data from the wireless device. The RAN node verifies the uplink data based on the old security information.

The present disclosure may have various advantageous effects.

According to some embodiments of the present disclosure, an apparatus and method for handling security information between a wireless device and a network for a fast RRC release procedure in a wireless communication system are provided.

For example, the UE and the NG-RAN may have the same security information (for example, {NH, NCC} pair) without additional signalling. Therefore, a wireless device could perform an EDT process more stably when the wireless device is on the RRC-IDLE state with suspended.

For example, the NG-RAN could have old security information for UL EDT and derive a new security key according to the resume case. In this case, the NG-RAN may use a new key derivation for the resume and/or handover. In addition, the NG-RAN may use the old security information for deciphering the UL EDT data.

For example, when a wireless device accesses to the last serving NG-RAN, the NG-RAN could reject the UE-triggered EDT procedure as soon as possible. Therefore, the unnecessary retransmission of the UL EDT data could be avoided.

For example, when the UE accesses to the new NG-RAN, the NG-RAN could use the stored UE context and synchronize the security key between the UE and NG-RAN. Therefore, the setup of a new RRC connection could be avoided. In addition, signalling exchange between the UE and NG-RAN could be reduced.

For example, the NG-RAN may use the stored UE context and synchronize the security key between the UE and NG-RAN. Since the setup of a new RRC connection is avoided, signalling exchange between the UE and NG-RAN could be reduced.

For example, when the fast RRC release is triggered, the NG-RAN may disallow the UE to trigger the EDT procedure. Therefore, unnecessary UL transmission could be avoided.

For example, the NG-RAN can determine whether to trigger the fast RRC release or not, according to the security request from the AMF. Therefore, security key mismatch between the UE and NG-RAN could be avoided.

For example, the NG-RAN could decide whether to trigger the fast RRC release or not according to the security policy from the AMF. Therefore, security key mismatch between the UE and NG-RAN could be avoided.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Figure 1:
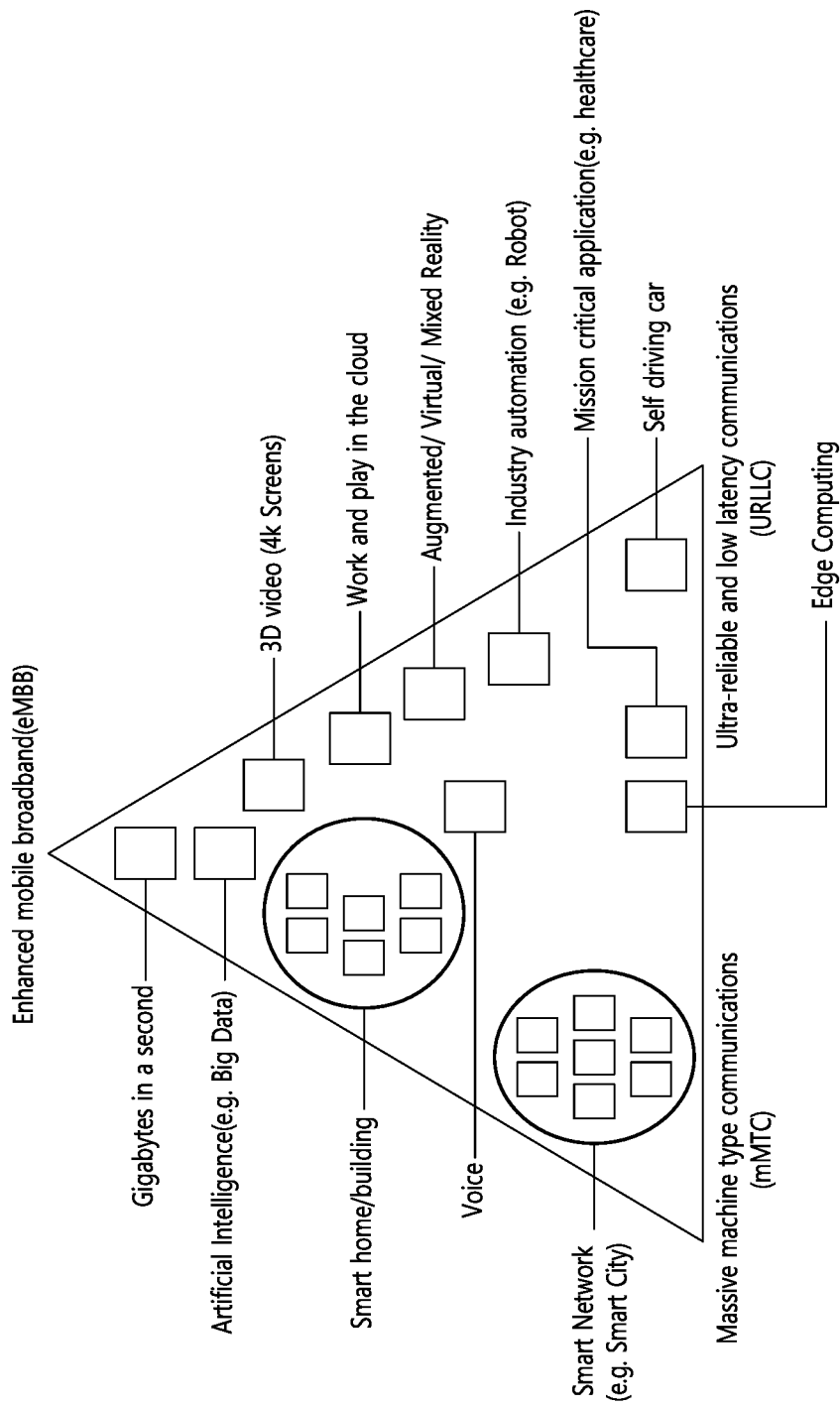
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
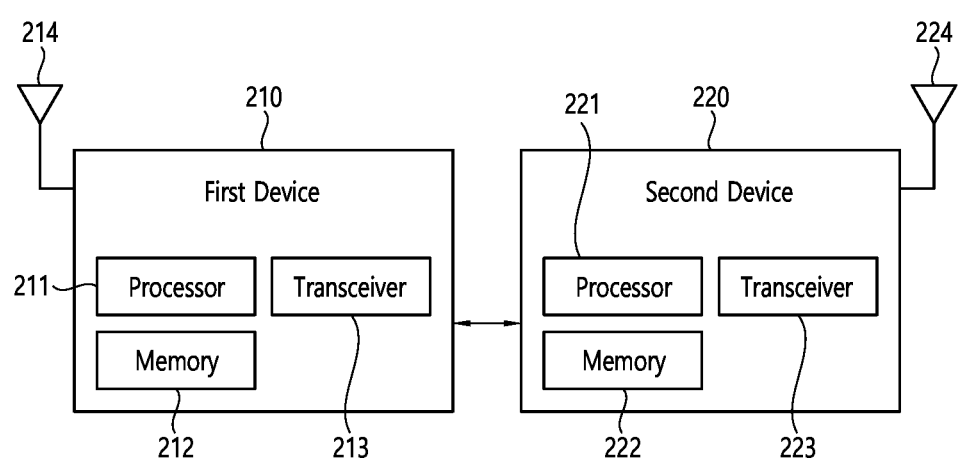
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
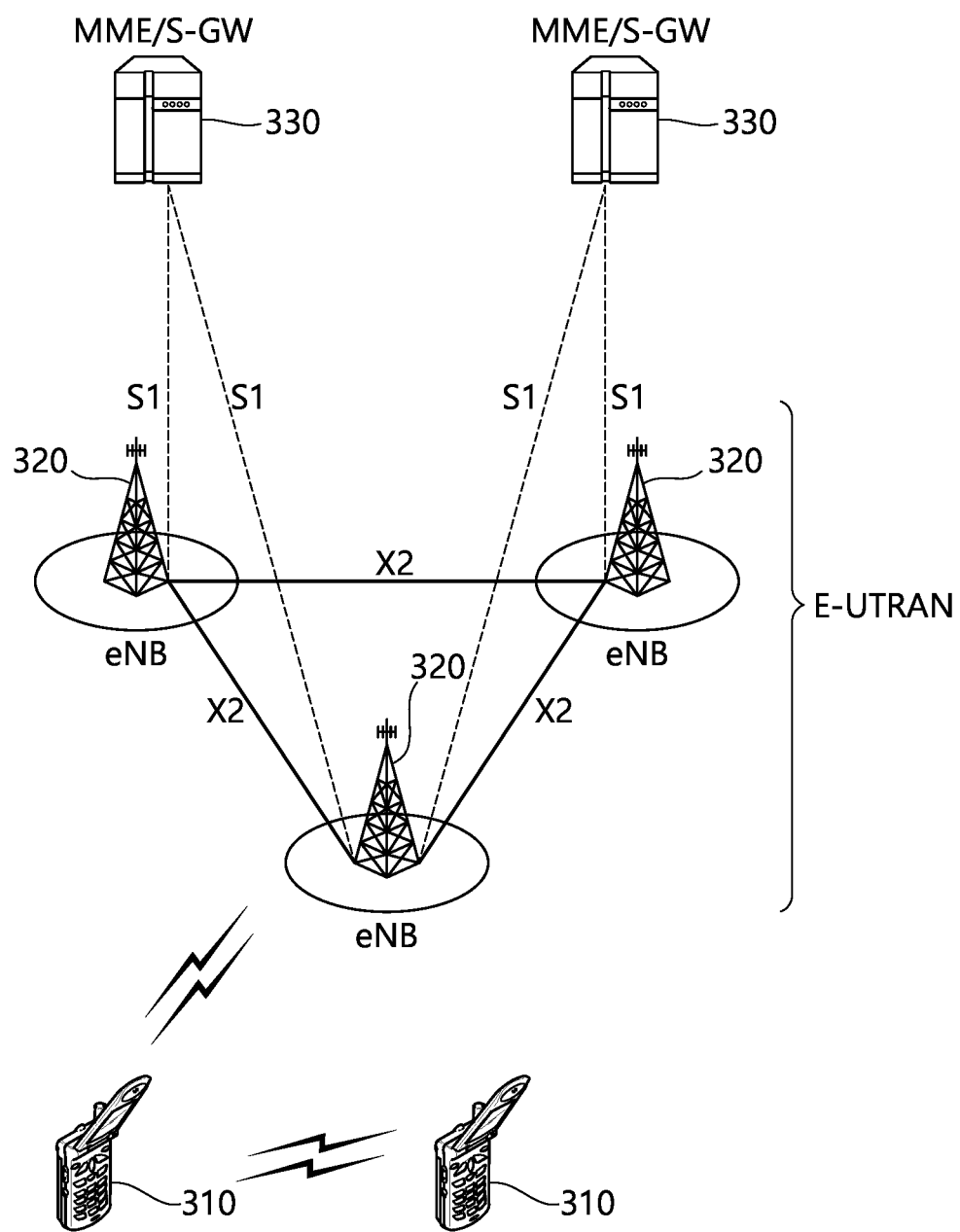
FIG. 3 shows another example of a wireless communication system to which the technical features of the present disclosure can be applied.

FIG. 3 shows another example of a wireless communication system to which the technical features of the present disclosure can be applied. Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10.

The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
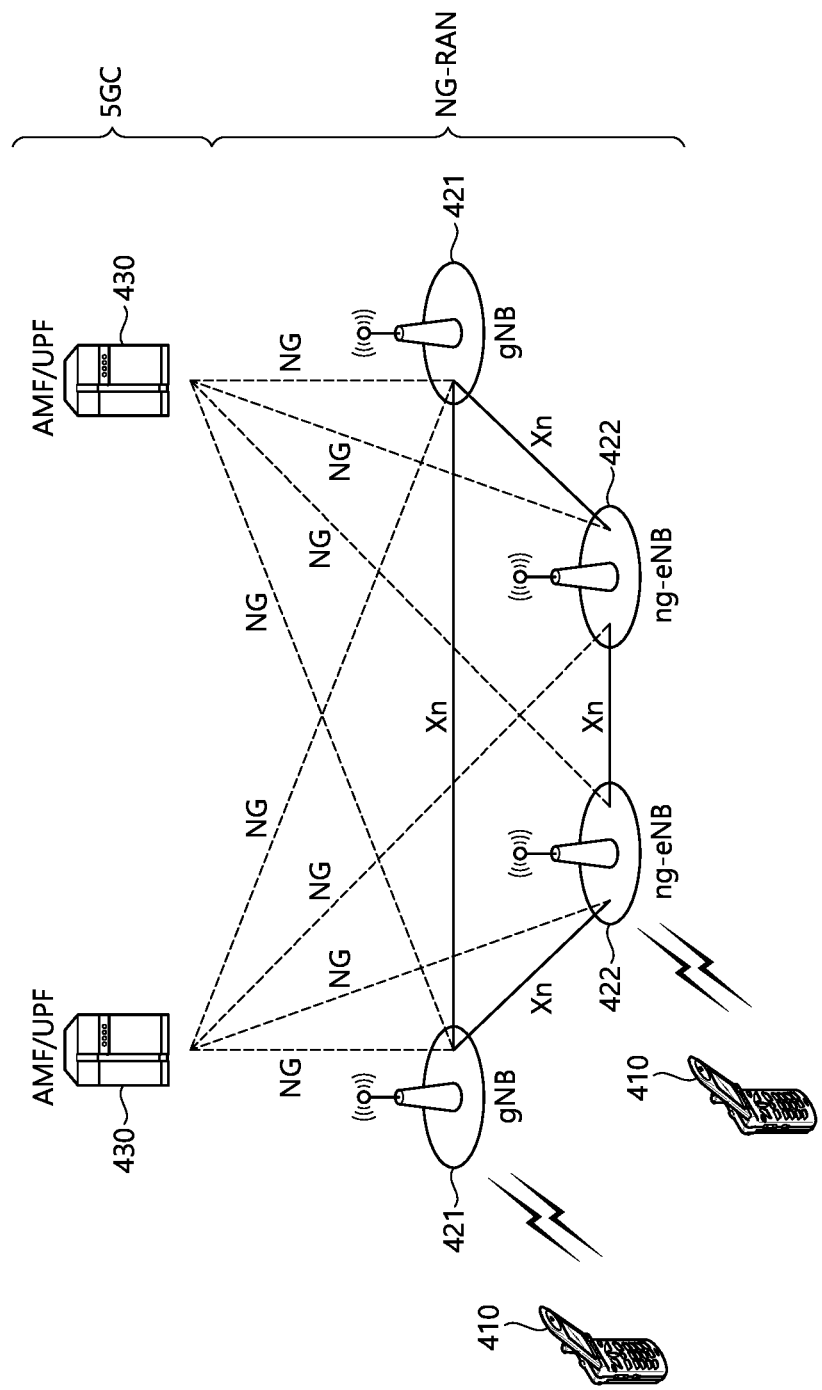
FIG. 4 shows another example of a wireless communication system to which the technical features of the present disclosure can be applied.

FIG. 4 shows another example of a wireless communication system to which the technical features of the present disclosure can be applied. Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
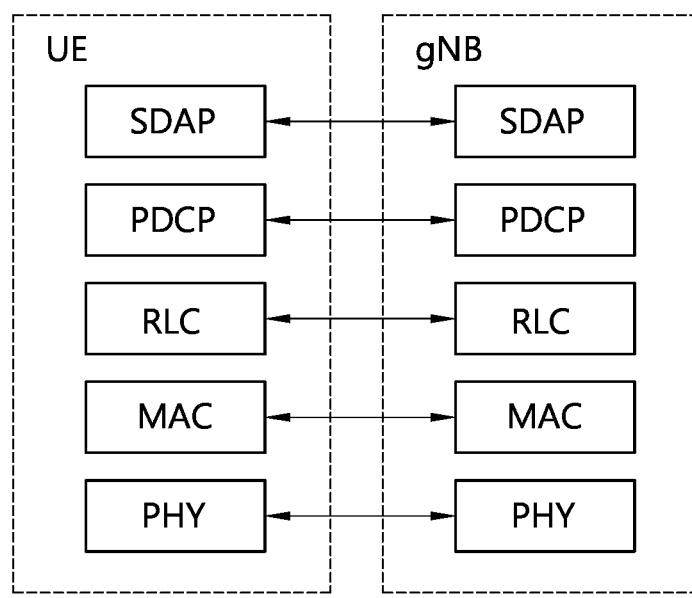
FIG. 5 shows a block diagram of a user plane protocol stack to which the technical features of the present disclosure can be applied.
Figure 6:
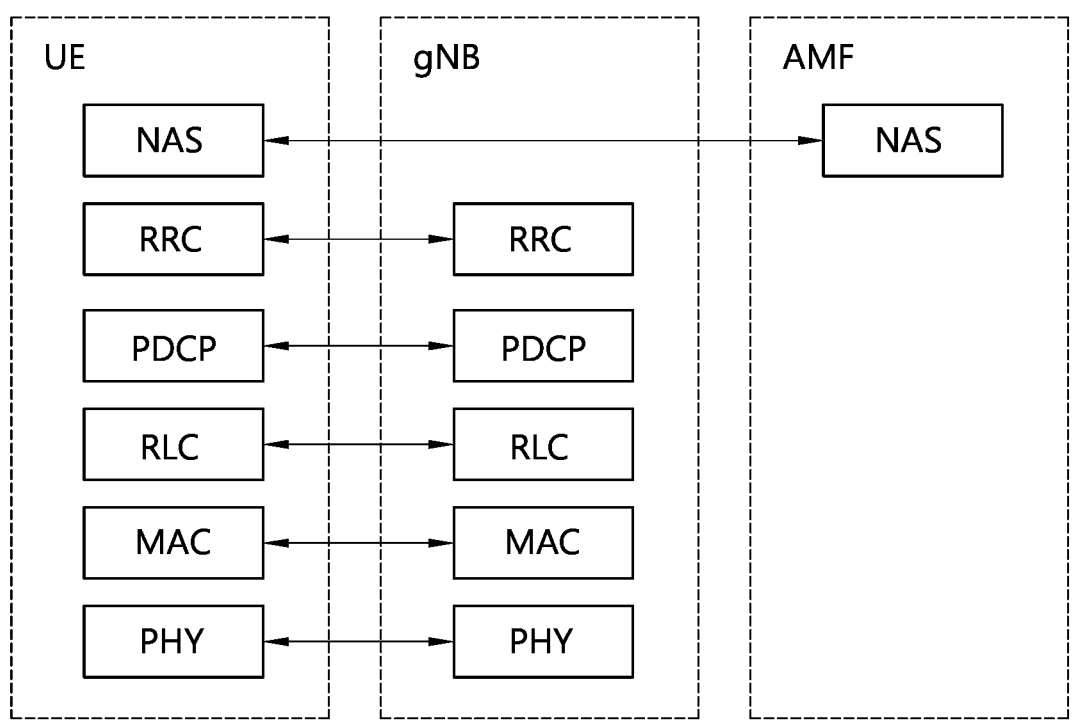
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied. The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 7:
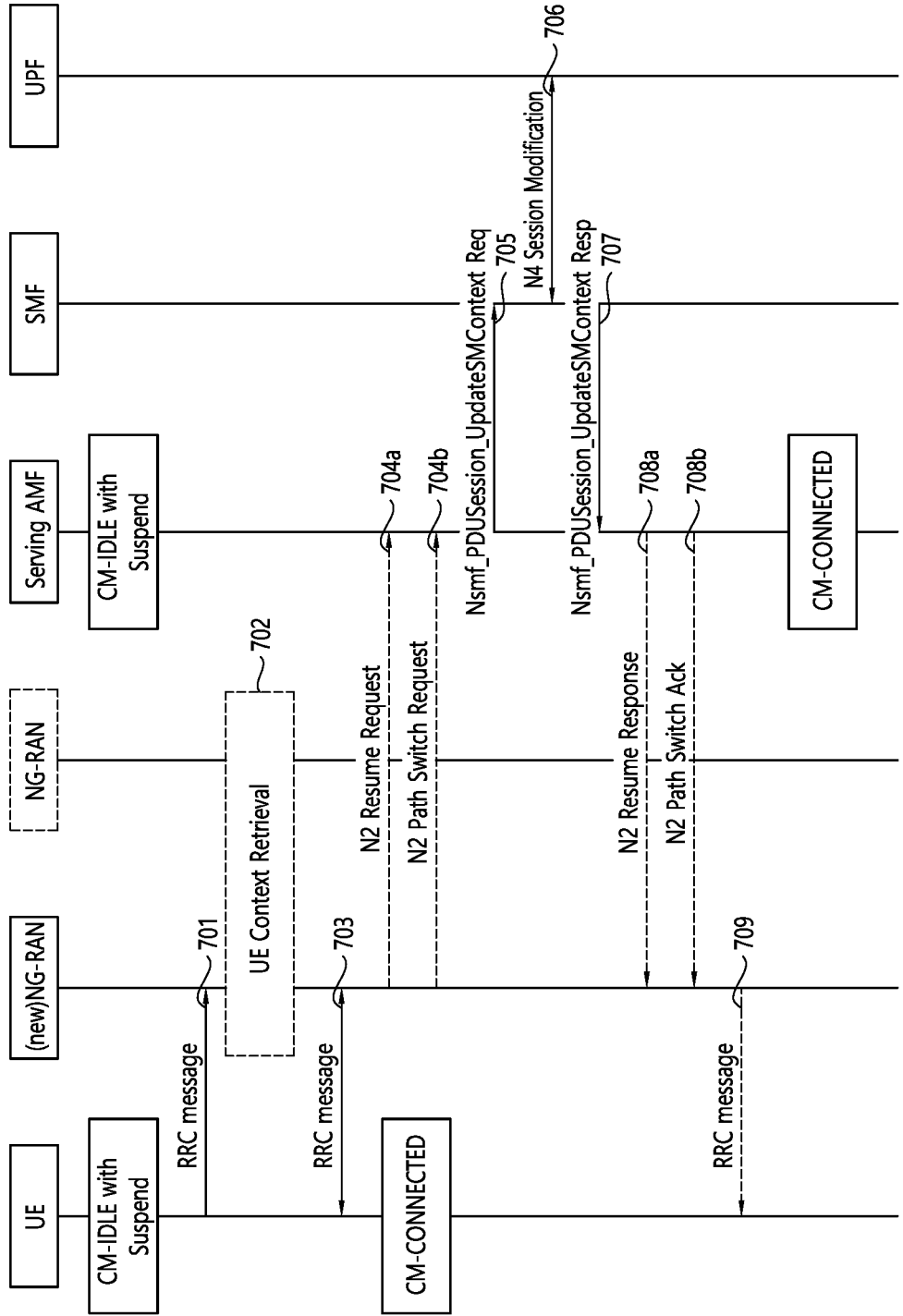
FIG. 7 shows an example of the Connection Resume in CM-IDLE with Suspend to which the technical features of the present disclosure can be applied.

Connection Resume in CM-IDLE with Suspend procedure will be described. It may be referred to as Section 4.8.2.3 of 3GPP TS 23.502 V16.1.1 (2019-06). FIG. 7 shows an example of the Connection Resume in CM-IDLE with Suspend to which the technical features of the present disclosure can be applied.

For the UE supporting User Plane CIoT 5GS Optimization, the Connection Resume procedure is used by the UE to perform RRC_IDLE with Suspend (e.g., RRC_INACTIVE) to RRC_CONNECTED state transition.

In step 701, a UE may transmit an RRC message to a next generation-radio access network (NG-RAN). For example, the RRC message may include a resume ID.

For example, the UE may initiate the transition from CM-IDLE and RRC IDLE state with Suspend to CM-CONNECTED and RRC Connected state. The UE may provide its Resume ID needed by the NG-RAN to access the UE's stored Context.

In step 702, the NG-RAN may perform UE Context Retrieval. For example, the UE Context Retrieval may be performed when the UE Context associated with the UE attempting to resume its connection is not locally available at the accessed NG-RAN.

In step 703, NG-RAN and UE may continue the resume procedure. In addition, access stratum configuration synchronization may be performed between the UE and the network (for example, the NG-RAN). The UE may enter CM-CONNECTED and RRC_CONNECTED.

In step 704a, the NG-RAN may transmit N2 Resume Request to the AMF. For example, if the NG-RAN is the same as the NG-RAN when UE is suspended, the NG-RAN may send N2 Resume Request to AMF including Resume cause, and N2 SM information which indicates the PDU sessions successfully resumed, and PDU sessions failed or partially failed to resume the user plane resource.

In step 704b, the NG-RAN may transmit N2 Path Switch Request to the AMF. For example, if the NG-RAN is different from the NG-RAN when UE is suspended, and the new NG-RAN is able to retrieve the UE Context from the old NG-RAN, the new NG-RAN node may initiate N2 Path Switch Request towards AMF.

In step 705, the AMF may transmit Nsmf_PDUSession_UpdateSMContext Request to the Session Management Function (SMF). For example, for each of the PDU Sessions indicated in step 704, the AMF may invoke Nsmf_PDUSession_UpdateSMContext Request (PDU Session ID, Cause, Operation type, User Location Information, Age of Location Information, N2 SM Information). The Operation Type may be set to "UP Resume" to indicate resume of user plane resources for the PDU Session.

For PDU Session(s) to be switched to the new NG-RAN, upon receipt of the Nsmf_PDUSession_UpdateSMContext request, the SMF may determine whether the existing UPF can continue to serve the UE. If the existing UPF could continue to serve the UE, step 706 may be performed.

In step 706, the SMF may transmit N4 Session Modification Request to User Plane Function (UPF). The N4 Session Modification Request may include AN Tunnel Info to be resumed, Buffering on/off. For example, the SMF initiates an N4 Session Modification procedure indicating the resume of AN tunnel. Buffering on/off may indicate whether the UPF shall buffer incoming DL PDU or not.

The UPF may send N4 Session Modification Response to acknowledge the SMF request.

In step 707, the SMF may transmit Nsmf_PDUSession_UpdateSMContext response to the AMF.

If new CN tunnel information is allocated for the PDU session, the SMF may include the new CN tunnel information as part of the N2 SM information.

If the resume for PDU session is unsuccessful, the SMF shall include the resume failure as part of the N2 SM information.

In step 708a, the AMF may transmit N2 Resume Response to NG-RAN. For example, after response for each PDU session in step 707, the AMF may send N2 Resume Response to NG-RAN and indicate success, including N2 SM information for PDU session received in step 707, if at least one PDU session is resumed successfully. If none of the PDU sessions is resumed successfully, the AMF may indicate failure to NG-RAN.

In step 708b, the AMF may send N2 Path Switch Acknowledge with PDU session resume information, if Path Switch Request is received in step 4.

For example, in step 708a or 708b, the AMF may provide Extended Connected Time value to the NG-RAN. If the NG-RAN receives the Extended Connected Time value, the NG-RAN may take this information into account when determining user inactivity.

Step 709 may be a conditional step. That is, step 709 may not be performed. In step 709, the NG-RAN may transmit an RRC message to the UE. For example, the NG-RAN may reconfigure the RRC connection based on resume result received from AMF.

Hereinafter, transport of NAS messages and early data transmission (EDT) are described. The following description of the RRC inactive state will be described by taking LTE-A as an example, but it can be applied to NR without loss of generality. For example, in the following description, eNB may be replaced with NG-RAN node/gNB and/or more generally BS, and MME may be replaced with AMF.

The AS provides reliable in-sequence delivery of NAS messages in a cell. During handover, message loss or duplication of NAS messages can occur.

In E-UTRAN, NAS messages are either concatenated with RRC messages or carried in RRC without concatenation. Upon arrival of concurrent NAS messages for the same UE requiring both concatenation with RRC for the high priority queue and also without concatenation for the lower priority queue, the messages are first queued as necessary to maintain in-sequence delivery.

In DL, when an EPS bearer establishment or release procedure is triggered, or for EDT, the NAS message should normally be concatenated with the associated RRC message. When the EPS bearer is modified and when the modification also depends on a modification of the radio bearer, the NAS message and associated RRC message should normally be concatenated. Concatenation of DL NAS with RRC message is not allowed otherwise. In UL concatenation of NAS messages with RRC message is used only for transferring the initial NAS message during connection setup and for EDT. Initial direct transfer is not used in E-UTRAN and no NAS message is concatenated with RRC connection request.

Multiple NAS messages can be sent in a single DL RRC message during EPS bearer establishment or modification. In this case, the order of the NAS messages in the RRC message shall be kept the same as that in the corresponding S1-AP message in order to ensure the in-sequence delivery of NAS messages.

NAS messages are integrity protected and ciphered by PDCP, in addition to the integrity protection and ciphering performed by NAS.

EDT allows one UL data transmission optionally followed by one DL data transmission during the random access procedure.

EDT is triggered when the upper layers have requested the establishment or resumption of the RRC connection for MO data (i.e. not signaling or short message service (SMS)) and the UL data size is less than or equal to a transport block size (TBS) indicated in the system information. EDT is not used for data over the control plane when using the user plane cellular IoT (CIoT) EPS optimizations.

EDT may be only applicable to bandwidth reduced low complexity (BL) UEs, UEs in enhanced coverage and/or narrowband IoT (NB-IoT) UEs.

Meanwhile, in UP CIoT 5GS optimization, for the cases of "no further data transmission", "single uplink transmission without a response" and "only a single DL data as a response to the UL transmission", the SA2 discusses whether to support the fast RRC release or not. This is because the RRC connection needs to be released as soon as possible when there is no more data transmission between the UE and the NG-RAN. In this case, the UE is able to return to the RRC-IDLE with suspend, thus resulting in efficient management for the UE's power.

Figure 8:
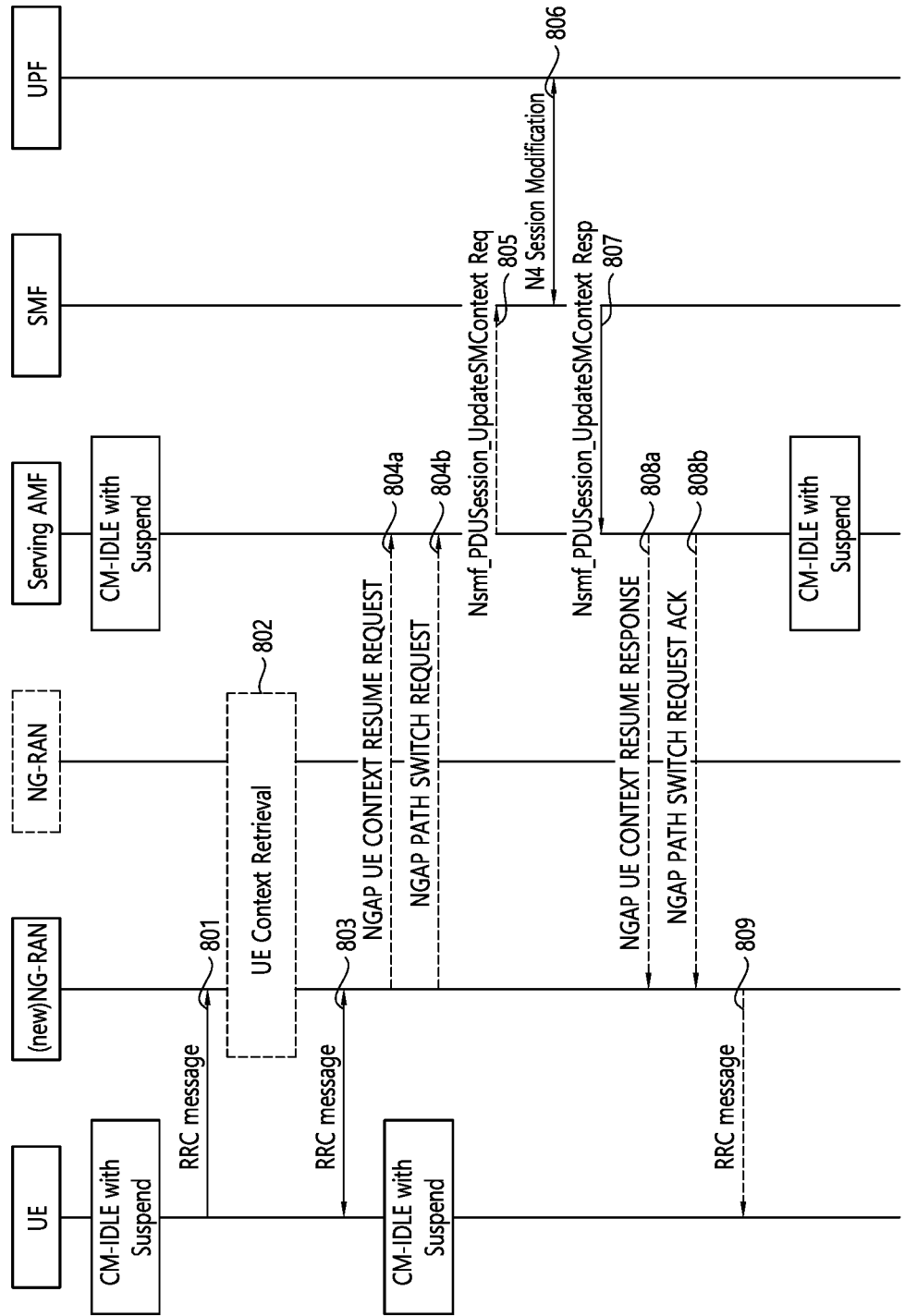
FIG. 8 shows an example scenario for a fast RRC release procedure which the technical features of the present disclosure can be applied.

FIG. 8 shows an example scenario for a fast RRC release procedure which the technical features of the present disclosure can be applied.

For the UE supporting User Plane CIoT 5GS Optimization, the fast RRC release procedure may be used by the UE to perform RRC_CONNECTED state and CM-CONNECTED state to RRC_IDLE with Suspend transition.

According to some embodiments of the present disclosure, the fast RRC release procedure may be used for the UE not to perform state transition. For example, a UE on RRC_IDLE with Suspend may return to RRC_IDLE with Suspend, after transmitting or receiving data via an early data transmission (EDT) without entering RRC_CONNECTED state.

In step 801, a UE may transmit an RRC message to a next generation-radio access network (NG-RAN). For example, the RRC message may include an indicator for releasing RRC connection.

In step 802, the NG-RAN may perform UE Context Retrieval. For other example, the UE Context Retrieval may be performed when the UE Context associated with the UE attempting to transmit uplink data without entering the RRC Connected state is not locally available at the accessed NG-RAN.

In step 803, NG-RAN may transmit RRC release message to the UE. For example, NG-RAN may transmit an RRC release message with suspend indication to the UE. For example, the NG-RAN may transmit the RRC Release message with suspend indication to the UE before the UE Context Resume procedure in order to support the fast RRC release. In this case, the UE may enter to the RRC-IDLE with suspend and CM-IDLE with suspend.

In step 804a, the NG-RAN may transmit an NGAP UE CONTEXT RESUME REQUEST message with a fast RRC release indication to the AMF. For example, the fast RRC release indication may be included in the NGAP UE CONTEXT RESUME REQUEST message. The fast RRC release indication may inform the AMF that the UE now returns into the RRC-IDLE with suspend immediately. Based on the fast RRC release indication, the AMF could restart the Periodic Registration Timer to avoid the state mismatch between the UE and AMF.

In step 804b, if the Retrieve UE Context procedure is performed in step 802, the NGAP PATH SWITCH REQUEST message may be used instead of the NGAP UE CONTEXT RESUME REQUEST message.

In step 805, the AMF may transmit Nsmf_PDUSession_UpdateSMContext Request to the Session Management Function (SMF). For example, for each of the PDU Sessions indicated, the AMF may invoke Nsmf_PDUSession_UpdateSMContext Request (PDU Session ID, Cause, Operation type, User Location Information, Age of Location Information, N2 SM Information).

In step 806, the SMF may transmit N4 Session Modification Request to User Plane Function (UPF). The N4 Session Modification Request may include AN Tunnel Info to be resumed, Buffering on/off. The UPF may send N4 Session Modification Response to acknowledge the SMF request.

In step 807, the SMF may transmit Nsmf_PDUSession_UpdateSMContext response to the AMF.

In step 808a, the AMF may transmit an NGAP UE CONTEXT RESUME Response message to NG-RAN.

In step 808b, if the Retrieve UE Context procedure is performed in step 802, the NGAP PATH SWITCH REQUEST ACK message may be used instead of the NGAP UE CONTEXT RESUME RESPONSE message.

In step 809, the NG-RAN may transmit a RRC message to UE. According to some embodiments of the present disclosure, step 809 may performed conditionally.

For example, if the Immediate RRC connection release in Resume Procedure Flag is set to "Allowed" for this UE, based on AS-Release Assistance Information provided by the UE in step 801, the NG-RAN may use the AS Release Assistance Information to decide to do an early RRC release directly after the expected data transmission(s) have been completed. The NG-RAN may send an N2 Suspend Request to the AMF and then releases the RRC connection.

For other example, the NG-RAN may reconfigure the RRC connection based on resume result received from AMF.

As shown in steps 803 and 804a of the FIG. 8, the RRC Release message with suspend indication is sent to the UE before the UE Context Resume procedure in order to support the fast RRC release. In addition, the fast RRC release indication is sent to the AMF by using the NGAP UE CONTEXT RESUME REQUEST message to inform that the UE now returns into the RRC-IDLE with suspend immediately. Based on this indication, the AMF can restart the Periodic Registration Timer to avoid the state mismatch between the UE and AMF.

However, there is occurred the problem in case a new NH derivation is needed in the AMF during the fast RRC release. When the NGAP UE CONTEXT RESUME REQUEST message is received, the AMF may need to derive the new NH value based on the security policy. In this case, the AMF may compute a fresh NH from its stored data, store that fresh {NH, NCC} pair and send it to the NG-RAN in the NGAP UE CONTEXT RESUME RESPONSE message. However, the UE is already sent back to the RRC-IDLE with suspend before initiating the UE Context Resume procedure. Therefore, the NG-RAN is not able to deliver the new fresh {NH, NCC} pair to the UE immediately, thus resulting in different {NH, NCC} pair stored at the UE and the NG-RAN.

For describing the present disclosure more clearly, details of the NH and NCC are described. It may be referred to as Section 3.1 and 6.9.2 of 3GPP TS 33.501 V15.5.0 (2019-06).

5G AS security context for 3GPP access includes the cryptographic keys at AS level with their identifiers, the Next Hop parameter (NH), the Next Hop Chaining Counter parameter (NCC) used for next hop access key derivation, the identifiers of the selected AS level cryptographic algorithms, the UE security capabilities, and the UP Security Policy at the network side, UP security activation status and the counters used for replay protection. In particular, NH and NCC need to be stored also at the AMF during connected mode.

Whenever an initial AS security context needs to be established between UE and gNB/ng-eNB, AMF and the UE shall derive a $K_{gNB}$ and a Next Hop parameter (NH). The $K_{gNB}$ and the NH are derived from the $K_{AMF}$. A NH Chaining Counter (NCC) is associated with each $K_{gNB}$ and NH parameter. Every $K_{gNB}$ is associated with the NCC corresponding to the NH value from which it was derived. At initial setup, the $K_{gNB}$ is derived directly from $K_{AMF}$, and is then considered to be associated with a virtual NH parameter with NCC value equal to zero. At initial setup, the derived NH value is associated with the NCC value one.

If the RRC Resume procedure for UP CIoT 5GS optimization is similar to the one for the UP CIoT EPS optimization, when the UE accesses to the NG-RAN to resume the RRC connection without the EDT, the NG-RAN can deliver the new fresh NCC value to the UE by using the RRC Resume message. However, when the UE requests to trigger the EDT for the UL data (i.e., the UE intends to transmit the UL data whose size is relatively small without transiting to RRC-CONNECTED), there is a critical security problem between the UE and the NG-RAN. This is because the UE uses the latest NCC value sent in the RRC Release message for EDT. While the UE ciphers the UL EDT data by using the UP key $K_{UPenc, Existing}$ based on existing unused {$NH_{Existing}$, $NCC_{Existing}$} pair, the NG-RAN tries to decipher the UL EDT data by $K_{UPenc, New}$ from the new fresh {$NH_{New}$, $NCC_{New}$} pair. Therefore, the NG-RAN fails to decipher the UL EDT data for the UE.

In the UP CIoT 5GS optimization, if the RRC Resume Request message contains the security key irrespective of the EDT, this problem is more critical. To avoid this problem, the NG-RAN needs to properly handle the security context for the fast RRC release.

Hereinafter, some embodiments for handling security information between a wireless device and a network for a fast RRC release procedure will be described. However, the present disclosure is not limited thereto. For example, each embodiment could be combined with each other. In addition, it is to be understood by those skilled in the art that the present disclosure includes combinations or variations of the following embodiments.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 9:
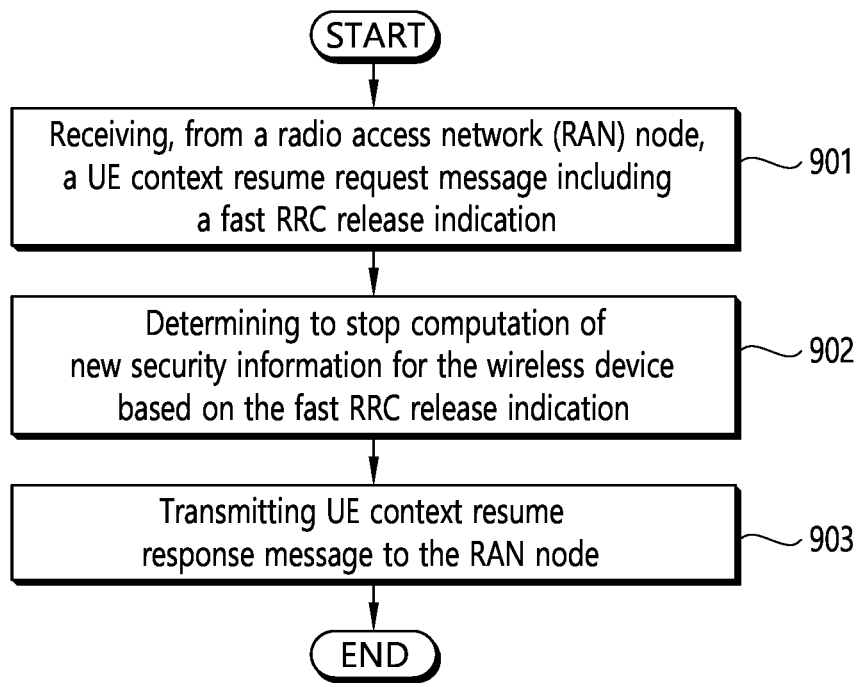
FIG. 9 shows an example method for handling security information between a wireless device and a network for the fast RRC release procedure, according to some embodiment of the present disclosure.

FIG. 9 shows an example method for handling security information between a wireless device and a network for the fast RRC release procedure, according to some embodiment of the present disclosure. The method may be performed by a core network node in a wireless communication system.

In step 901, a core network node may receive, from a radio access network (RAN) node, a UE context resume request message including a fast Radio Resource Control (RRC) release indication. The fast RRC release indication may inform that the RAN node transmits an RRC release message to a wireless device before the AMF receives the UE context resume request message. For example, the new security information may include a new Next Hop (NH) and/or a new NH Chaining Count (NCC).

According to some embodiment of the present disclosure, the wireless device and the RAN node may have old security information which is generated before stopping the computation of the new security information. For example, the old security information may include an old Next Hop (NH) and/or an old NH Chaining Count (NCC).

According to some embodiment of the present disclosure, a core network node may receive, from the RAN node, an NGAP PATH SWITCH REQUEST message instead of the UE context resume request message. In this case, the fast RRC release indication is included in the NGAP PATH SWITCH REQUEST message.

In step 902, a core network node may determine to stop computation of new security information for the wireless device based on the fast RRC release indication. In addition, a core network may start a Periodic Registration Timer upon receiving the fast RRC release indication.

In step 903, a core network node may transmit a UE context resume response message to the RAN node. Since, the new security information is not generated in step 902, the new security information may not be included in the UE context resume response message.

According to some embodiment of the present disclosure, a core network node may transmit, to the RAN node, an NGAP PATH SWITCH REQUEST ACK instead of the UE context resume response message.

Since, the wireless device and the RAN node have the old security information, the RAN node could verify uplink data, from the wireless device, based on the old security information.

The method performed by a radio access network (RAN) node in a wireless communication system, according to some embodiments of the present disclosure, will be described.

A RAN node may transmit, to a wireless device, old security information. The old security information may be included in an RRC release message from the RAN node to the wireless device.

The RAN node may transmit, to a core network node, a UE context resume request message including a fast RRC release indication after transmitting the RRC release message to the wireless device. The core network node may stop computation of new security information for the wireless device based on the fast RRC release indication. The new security information may be different from the old security information.

The RAN node may receive uplink data from the wireless device. The wireless device may transmit the uplink data via an early data transmission (EDT) procedure, while the wireless device is on RRC-IDLE with suspend.

The RAN node may verify the uplink data based on the old security information. For example, when a short MAC-I included in the uplink data is matched to a security key derived from the old security data, the RAN node may decide that the uplink data is verified.

According to some embodiment of the present disclosure, the core network node is an access and mobility management function (AMF) and the RAN node may be a next generation Node B (gNB).

According to some embodiment of the present disclosure, the core network node may be a mobility management entity (MME) and the RAN node is an evolved Node B (eNB).

According to some embodiment of the present disclosure, the wireless device may be an autonomous driving apparatus in communication with at least one of a mobile terminal, a network, and/or autonomous vehicles other than the wireless device.

Embodiment 1

Hereinafter, the embodiment 1 of the present disclosure will be described with reference to FIG. 10.

In order to avoid security key mismatch between the UE and NG-RAN, the example method, according to the embodiment 1 of the present disclosure, is that the AMF does not derive the new fresh {NH, NCC} pair, when the fast RRC release procedure is performed. That is, when the Fast RRC Release Indication is included into the NGAP UE CONTEXT RESUME REQUEST message, the AMF may stop the computation of the new fresh {NH, NCC} pair. Therefore, the UE and the NG-RAN may use the existing unused {NH, NCC} pair.

Figure 10:
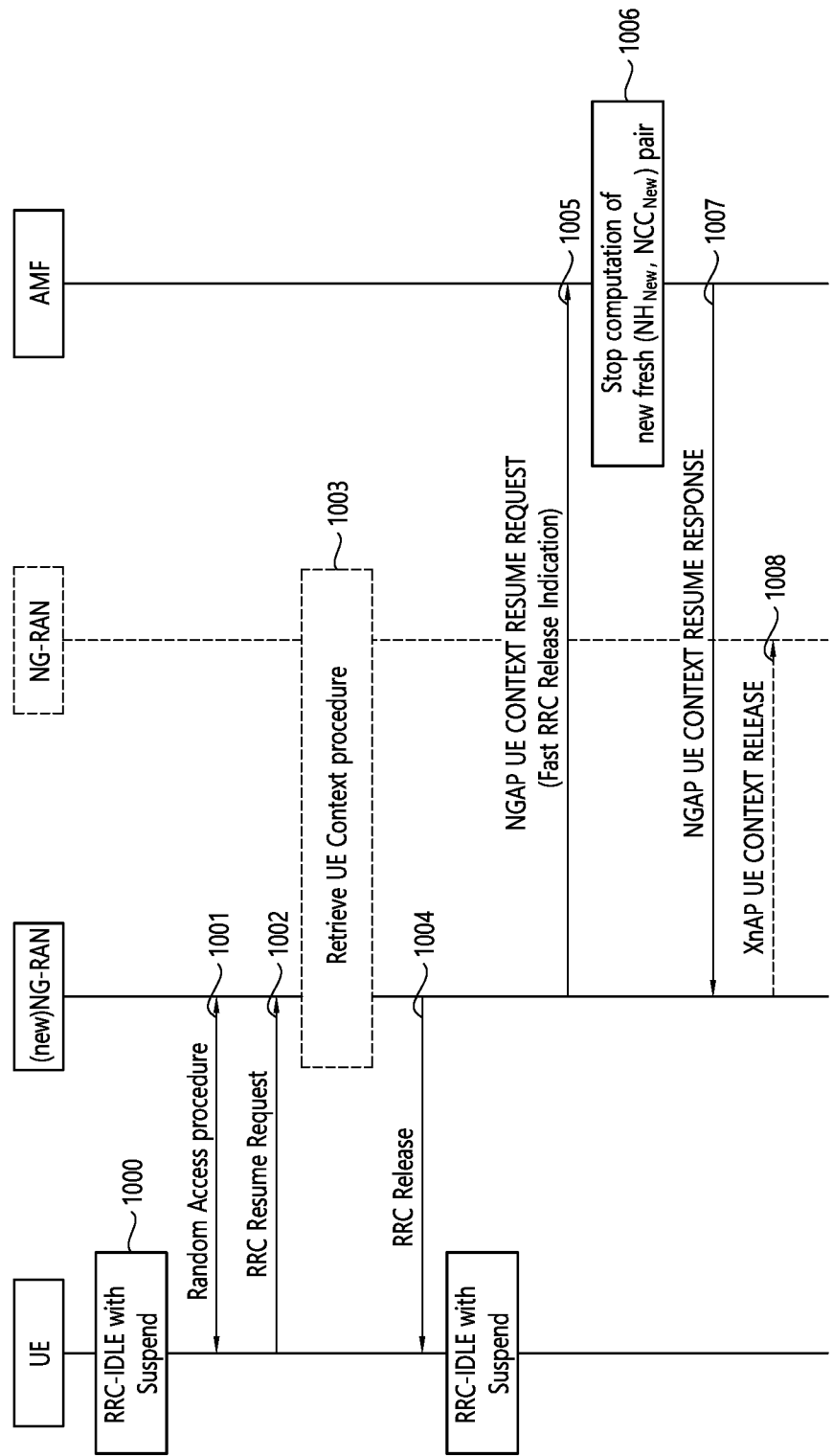
FIG. 10 shows an example method for handling security information between a wireless device and a network for a fast RRC release procedure according to the embodiment 1 of the present disclosure.

FIG. 10 shows an example method for handling security information between a wireless device and a network for a fast RRC release procedure according to the embodiment 1 of the present disclosure.

In step 1000, the UE may be in the RRC-IDLE with suspend. In this case, the UE may store the AS context, suspends all SRBs and DRBs.

In step 1001, at some later point in time (e.g. when the UE is being paged or when new data arrives in the uplink buffer) the UE may decide to resume the connection, and then initiate the Random Access procedure. This step may be performed for UL EDT.

In step 1002, the UE may send an RRC Resume Request message to the NG-RAN to resume the RRC connection. The UE may include its Resume ID (or I-RNTI), the establishment cause, and authentication token. The Resume ID (or I-RNTI) is used by the NG-RAN to access the stored information required to resume the RRC connection. The authentication token (e.g., Short MAC-I) is used to allow the NG-RAN to verify the UE identity.

For EDT, the UL data may be transmitted on DTCH multiplexed with this message on CCCH.

In step 1003, on receiving the message from the UE, the NG-RAN first checks whether it is able to find the UE context or not. If not, the new NG-RAN may resolve the NG-RAN identity contained in the Resume ID (or I-RNTI), and initiates the XnAP Retrieve UE Context procedure to get the UE context from the last serving NG-RAN. In this case, the new NG-RAN becomes the serving NG-RAN.

If the UL data is received in step 1002, the NG-RAN may decipher the data, and then forward it to a core network node (for example, user plane function (UPF)).

In Step 1004, if the NG-RAN decides to trigger the fast RRC release, the NG-RAN may send the RRC Release message with suspend indication to the UE.

On receiving the RRC Release message with suspend indication from the NG-RAN, the UE then may store the AS context, suspend all SRBs and DRBs, and enter to the RRC-IDLE with suspend.

In step 1005, the NG-RAN may send to the AMF the NGAP UE CONTEXT RESUME REQUEST message. If the NG-RAN decides to trigger the fast RRC release in step 1004, this message may include the Fast RRC Release Indication, which is used to indicate to the AMF that the UE now returns into the RRC-IDLE with suspend immediately.

If the Retrieve UE Context procedure is performed in step 1003, the NGAP PATH SWITCH REQUEST message may be used instead of the NGAP UE CONTEXT RESUME REQUEST message.

In step 1006, when the Fast RRC Release Indication is received in step 5, the AMF may restart the Periodic Registration Timer, and then may not compute new fresh $\{NH_{New}, NCC_{New}\}$ pair to avoid the security key mismatch between the UE and NG-RAN.

In step 1007, the AMF responds with the NGAP UE CONTEXT RESUME RESPONSE message to the NG-RAN.

If the Retrieve UE Context procedure is performed in step 1003, the NGAP PATH SWITCH REQUEST ACK message may be used instead of the NGAP UE CONTEXT RESUME RESPONSE message.

In step 1008, if the Retrieve UE Context procedure is performed in step 1003, the (new) NG-RAN may trigger the release of the UE resources at the last serving NG-RAN.

According to the embodiment 1 of the present disclosure, the UE and the NG-RAN may have the same security information (for example, {NH, NCC} pair) without additional signalling.

According to the embodiment 1 of the present disclosure, a wireless device could perform an EDT process more stably when the wireless device is on the RRC-IDLE state with suspended.

Embodiment 2

Hereinafter, the embodiment 2 of the present disclosure will be described with reference to FIGS. 11 to 13.

In order to avoid security key mismatch between the UE and NG-RAN, the embodiment 2 of the present disclosure is that the AMF derives the new fresh {NH, NCC} pair for the fast RRC release case and sends it to the NG-RAN. Then, the NG-RAN may store the new fresh {NH, NCC} pair for next resume/handover case. In addition, the NG-RAN may keep the existing unused {NH, NCC} pair for the EDT. Therefore, for next resume request without the EDT, the NG-RAN may use the new fresh {NH, NCC} pair, whereas the NG-RAN derives a new security key based on the existing unused {NH, NCC} pair.

Figure 11:
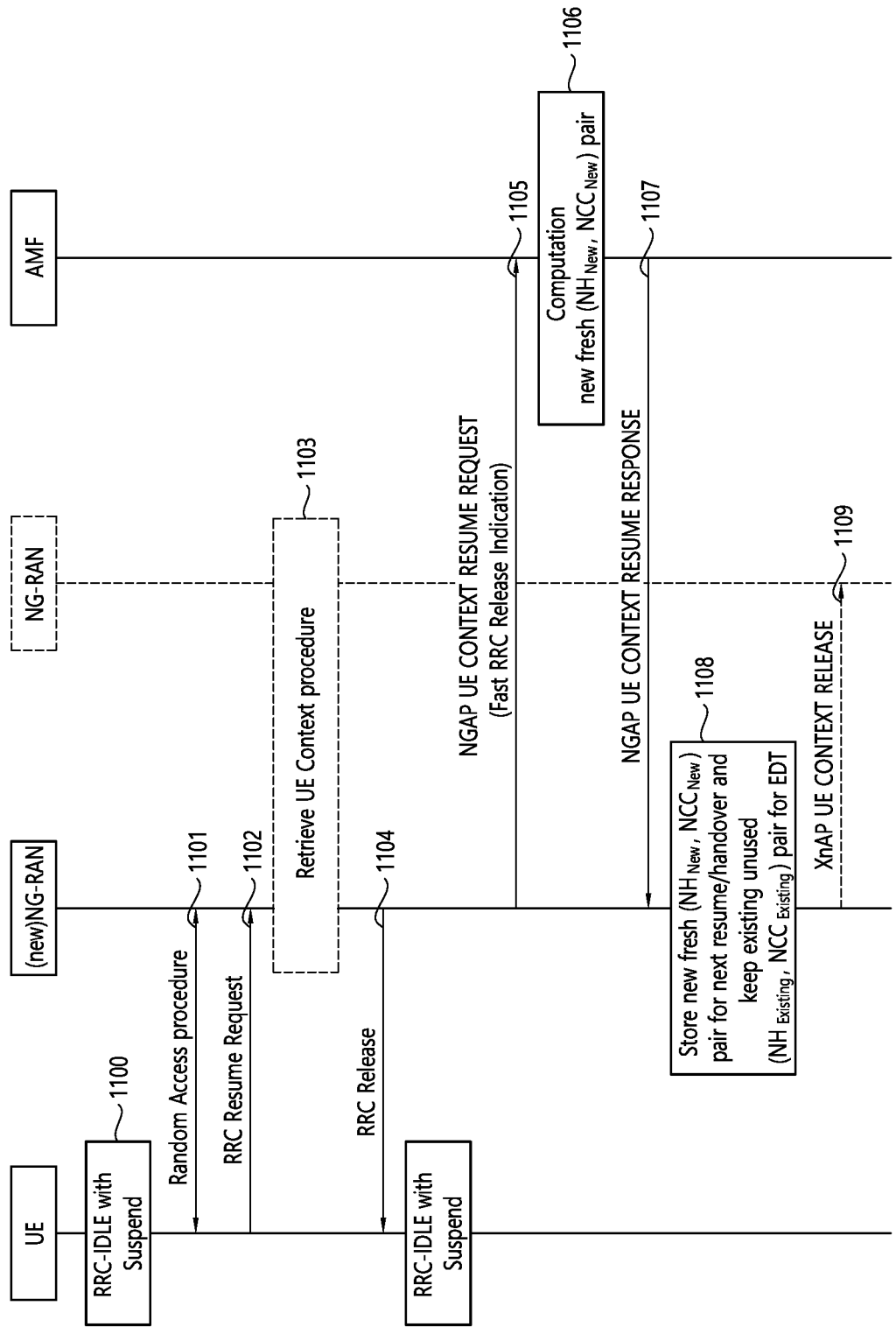
FIG. 11 shows an example method for handling security information between a wireless device and a network for a fast RRC release procedure according to the embodiment 2 of the present disclosure.

FIG. 11 shows an example method for handling security information between a wireless device and a network for a fast RRC release procedure according to the embodiment 2 of the present disclosure. In particular, FIG. 11 show a diagram for the first fast RRC release case, according to the embodiment 2, to avoid security key mismatch between the UE and NG-RAN.

In step 1100, the UE may be in the RRC-IDLE with suspend. In this case, the UE may store the AS context, and suspend all SRBs and DRBs.

In step 1101, at some later point in time (e.g. when the UE is being paged or when new data arrives in the uplink buffer) the UE may decide to resume the connection, and then initiate the Random Access procedure. This step may be performed for UL EDT.

In step 1102, the UE may send an RRC Resume Request message to the NG-RAN to resume the RRC connection. The RRC Resume Request message may include its Resume ID (or I-RNTI), the establishment cause, and authentication token. The Resume ID (or I-RNTI) is used by the NG-RAN to access the stored information required to resume the RRC connection. The authentication token (e.g., Short MAC-I) is used to allow the NG-RAN to verify the UE identity.

For EDT, the UL data may be transmitted on DTCH multiplexed with this message on CCCH.

In step 1103, on receiving the message from the UE, the NG-RAN first checks whether it is able to find the UE context or not. If not, the new NG-RAN resolves the NG-RAN identity contained in the Resume ID (or I-RNTI), and initiates the XnAP Retrieve UE Context procedure to get the UE context from the last serving NG-RAN. In this case, the new NG-RAN becomes the serving NG-RAN.

If the UL data is received in step 1102, the NG-RAN may decipher the data, and then forward it to UPF.

In step 1104, if the NG-RAN decides to trigger the fast RRC release, the NG-RAN may send the RRC Release message with suspend indication to the UE.

On receiving the RRC Release message with suspend indication from the NG-RAN, the UE may store the AS context, suspend all SRBs and DRBs, and enter to the RRC-IDLE with suspend.

In step 1105, the NG-RAN may send to the AMF the NGAP UE CONTEXT RESUME REQUEST message. If the NG-RAN decides to trigger the fast RRC release in step 1104, this message may include the Fast RRC Release Indication, which is used to indicate to the AMF that the UE now returns into the RRC-IDLE with suspend immediately.

If the Retrieve UE Context procedure is performed in step 1103, the NGAP PATH SWITCH REQUEST message may be used instead of the NGAP UE CONTEXT RESUME REQUEST message. In this case, the NGAP UE CONTEXT RESUME REQUEST message may include the Fast RRC Release Indication.

In step 1106, the AMF may compute new fresh $\{NH_{New}, NCC_{New}\}$ pair. When the Fast RRC Release Indication is received in step 1105, the AMF may restart the Periodic Registration Timer.

In step 1107, the AMF responds with the NGAP UE CONTEXT RESUME RESPONSE message including new fresh $\{NH_{New}, NCC_{New}\}$ pair to the NG-RAN.

If the Retrieve UE Context procedure is performed in step 1103, the NGAP PATH SWITCH REQUEST ACK message may be used instead of the NGAP UE CONTEXT RESUME RESPONSE message. In this case, the NGAP UE CONTEXT RESUME REQUEST message may include the new fresh $\{NH_{New}, NCC_{New}\}$ pair.

In step 1108, the NG-RAN may store the fresh $\{NH_{New}, NCC_{New}\}$ pair for next resume and/or handover. In addition, the NG-RAN may keep the existing unused $\{NH_{Existing}, NCC_{Existing}\}$ pairs for EDT.

In step 1109, if the Retrieve UE Context procedure is performed in step 1103, the NG-RAN may trigger the release of the UE resources at the last serving NG-RAN.

Figure 12A:
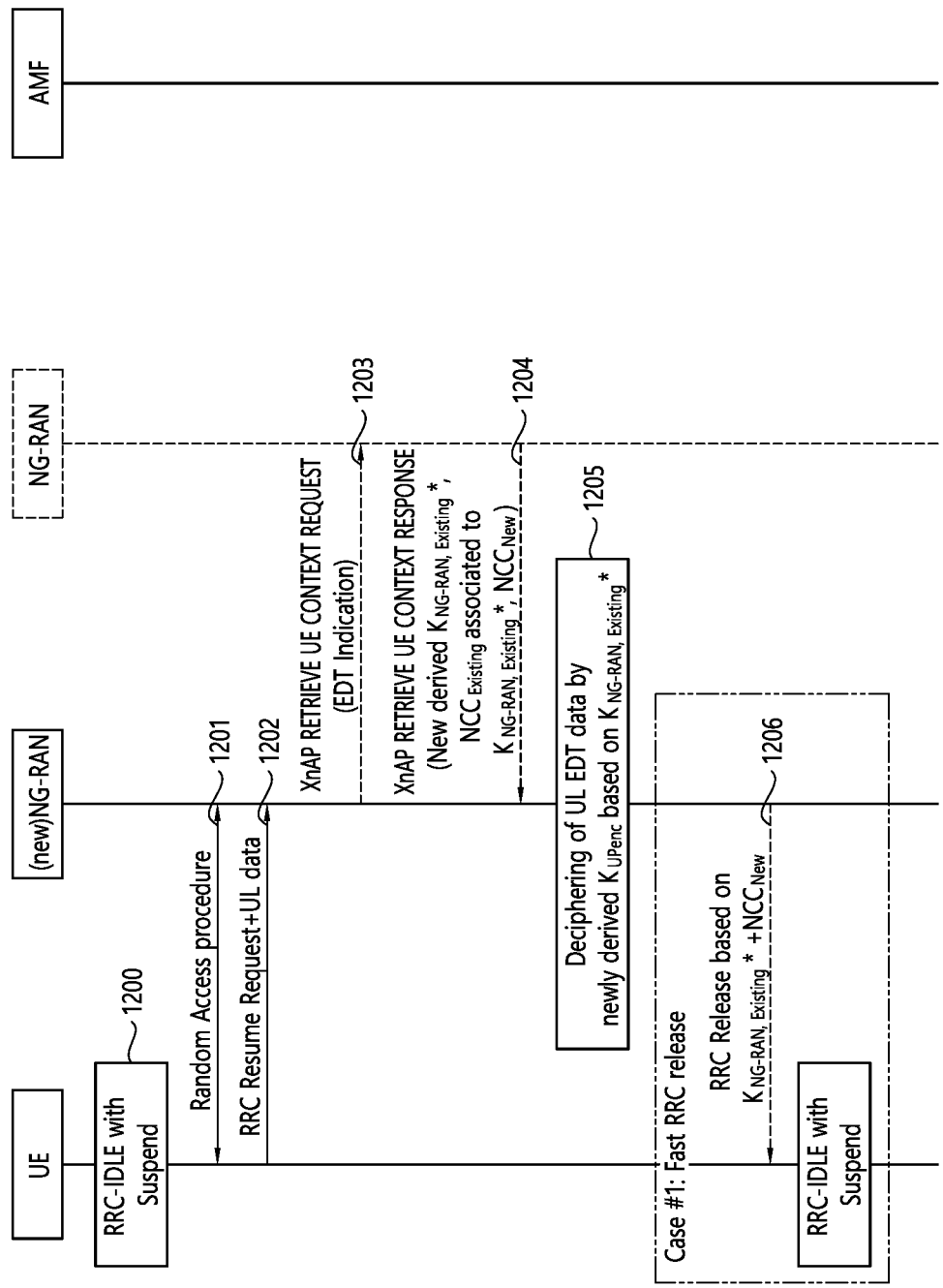
FIGS. 12A and 12B show an example method for handling security information between a wireless device and a network for a fast RRC release procedure according to the embodiment 2 of the present disclosure.
Figure 12B:
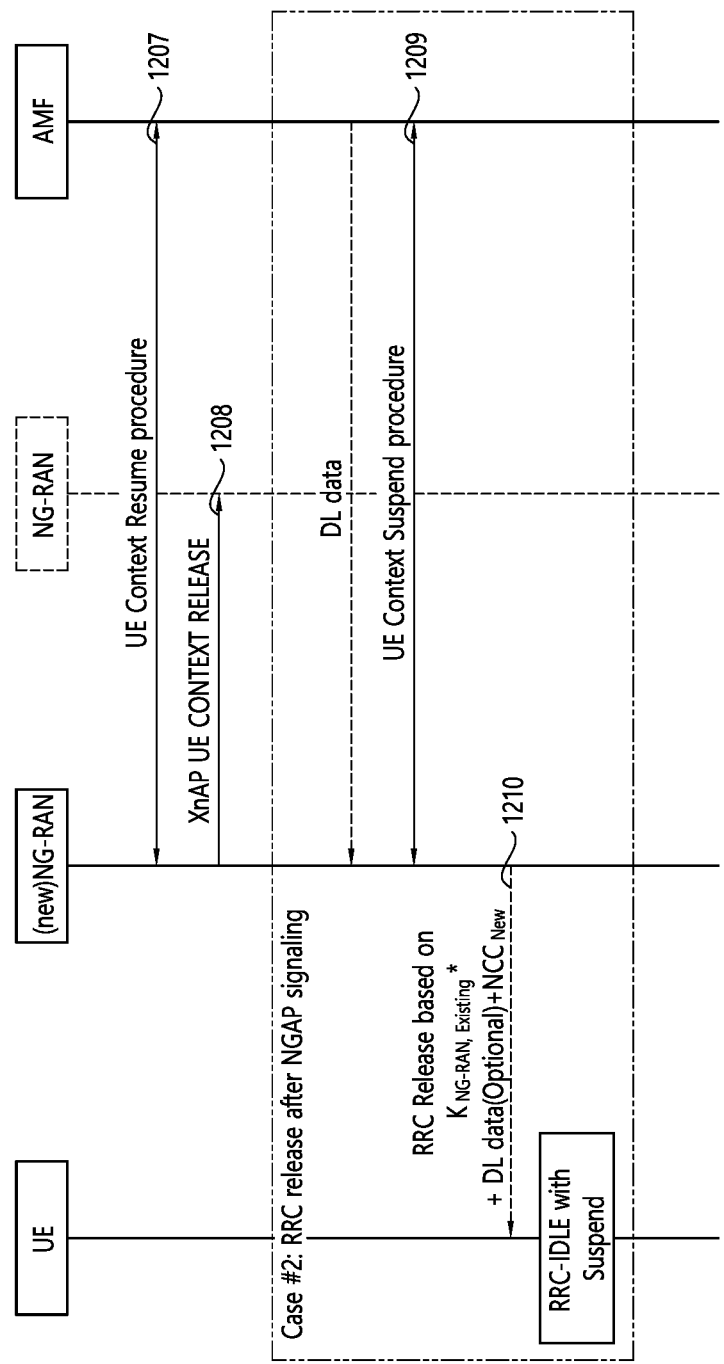

FIGS. 12A and 12B show an example method for handling security information between a wireless device and a network for a fast RRC release procedure according to the embodiment 2 of the present disclosure. In particular, FIGS. 12A and 12B show a diagram of the next resume case (i.e., fast RRC release or RRC release after NGAP signalling) after the procedure in FIG. 11 is performed.

In step 1200, the UE may be in the RRC-IDLE with suspend. In this case, the UE may store the AS context, suspend all SRBs and DRBs. Since the procedure in FIG. 11 is already performed prior to the beginning of this procedure, the last serving NG-RAN may store the $\{NH_{New},$ $NCC_{New}$} pair for next resume/handover and {$NH_{Existing}$, $NCC_{Existing}$} pair for EDT, respectively.

In step 1201, upon connection resumption request for Mobile Originated data from the upper layers, the UE may initiate the early data transmission procedure and select a random access preamble configured for EDT.

In step 1202, the UE may send an RRC Resume Request message to the NG-RAN to resume the RRC connection. The UE may include its Resume ID (or I-RNTI), the establishment cause, and authentication token. The Resume ID (or I-RNTI) is used by the NG-RAN to access the stored information required to resume the RRC connection. The authentication token (e.g., Short MAC-I) is used to allow the NG-RAN to verify the UE identity.

For EDT, the UL data is also transmitted on DTCH multiplexed with this message on CCCH. This UL data is ciphered by the UP key $K_{UPenc}$ from newly derived $K_{NG-RAN, Existing}*$ based on the existing unused {$NH_{Existing}$, $NCC_{Existing}$} pair.

In step 1203, on receiving the message from the UE, the NG-RAN may check firstly whether it is able to find the UE context or not. If not, the new NG-RAN may resolve the NG-RAN identity contained in the Resume ID (or I-RNTI), and send the XnAP RETRIEVE UE CONTEXT message to get the UE context from the last serving NG-RAN. In order to indicate to the last serving NG-RAN that the EDT for UL data is triggered, the new NG-RAN may include the EDT indication.

The last serving NG-RAN may calculate and verify the authentication token (e.g., Short MAC-I). If the check of the authentication token is successful, then last serving NG-RAN may derive a new $K_{NG-RAN, Existing}*$ from the existing unused $NH_{Existing}$.

For example, the new NG-RAN may send to the last serving NG-RAN the RRC Establishment Cause set to 'EDT' instead of the EDT indication.

For example, when the new NG-RAN does not include the EDT indication or RRC Establishment Cause set to 'EDT', the last serving NG-RAN may derive two new $K_{NG-RAN}*$ values (i.e., $K_{NG-RAN, Existing}*$ from the existing unused $NH_{Existing}$ and $K_{NG-RAN, New}*$ from the new fresh $NH_{New}$).

In step 1204, the last serving NG-RAN may send to the new NG-RAN the XnAP RETRIEVE UE CONTEXT RESPONSE message including the new derived $K_{NG-RAN, Existing}*$, the $NCC_{Existing}$ associated to the $K_{NG-RAN, Existing}*$, and $NCC_{New}$. The new NG-RAN can be aware that, from the $NCC_{New}$ value, the current security key is derived from the existing unused $NH_{Existing}$ for EDT, and the $NCC_{New}$ should be used for the state transition to RRC-CONNTECTED.

In this case, the new NG-RAN may become the serving NG-RAN.

For example, when the new NG-RAN does not include the EDT indication or RRC Establishment Cause set to 'EDT', it also includes $K_{NG-RAN, New}*$ into the XnAP RETRIEVE UE CONTEXT RESPONSE message.

In step 1205, the serving NG-RAN may derive new AS keys (RRC integrity key, RRC encryption key and UP keys) corresponding to the algorithms from the received $K_{NG-RAN, Existing}*$. Then, the NG-RAN may decipher the UL EDT data by using the newly derived $K_{UPenc}$, and forwards it to UPF.

In step 1206, when the NG-RAN decides to trigger the fast RRC release, the NG-RAN may send the RRC Release message with suspend indication to the UE. This message is integrity protected in PDCP layer using the new AS keys based on the $K_{NG-RAN, Existing}*$. In addition, the $NCC_{New}$ value is included for next resume.

On receiving the RRC Release message with suspend indication from the NG-RAN, the UE may store the AS context, suspend all SRBs and DRBs, and enter to the RRC-IDLE with suspend.

If the NG-RAN does not trigger the fast RRC release, this step could be skipped.

In step 1207, the NG-RAN may initiate the UE Context Resume procedure. If the NG-RAN decides to trigger the fast RRC release in step 1206, the Fast RRC Release Indication may be sent to the AMF to inform that the UE now returns into the RRC-IDLE with suspend immediately.

If the Retrieve UE Context procedure is performed in step 1203, the Path Switch procedure may be used instead of the UE Context Resume procedure.

In step 1208, if the Retrieve UE Context procedure is performed in step 1203, the NG-RAN may trigger the release of the UE resources at the last serving NG-RAN.

In step 1209, if the UPF has only a single DL data as a response to the UL data, the UPF may forward the DL data to the NG-RAN. Then, when there is no further data transmission, the NG-RAN may initiate the UE Context Suspend procedure to suspend NG connection after the reception of the DL data.

If the NG-RAN decides to trigger the fast RRC release or the state transition to RRC-CONNECTED in step 1206, step 1209-1210 could be skipped.

In step 1210, when step 1209 is performed, the NG-RAN may send the RRC Release message with suspend indication to the UE. This message may be integrity protected in PDCP layer using the new AS keys based on the $K_{NG-RAN, Existing}*$. In addition, the $NCC_{New}$ value may be included for next resume.

On receiving the RRC Release message with suspend indication from the NG-RAN, the UE may store the AS context, suspend all SRBs and DRBs, and enter to the RRC-IDLE with suspend.

Figure 13A:
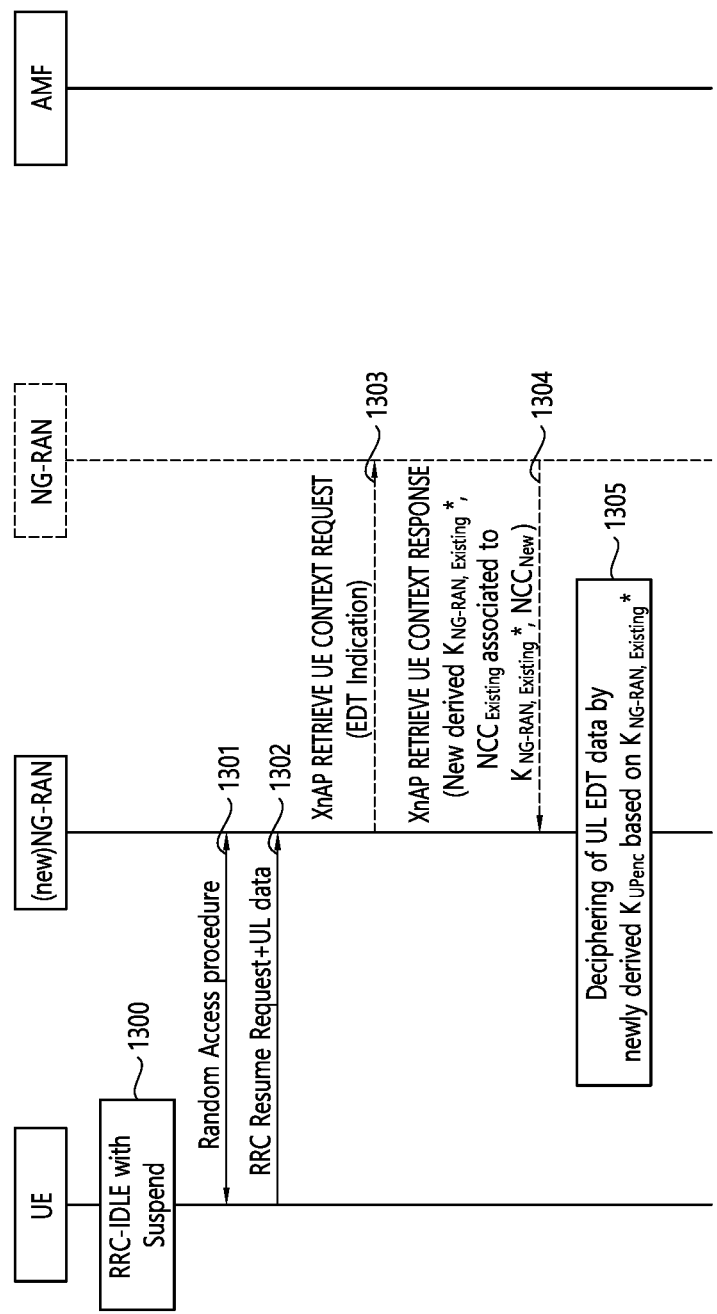
FIGS. 13A and 13B show an example method for handling security information between a wireless device and a network for a fast RRC release procedure according to the embodiment 2 of the present disclosure.
Figure 13B:
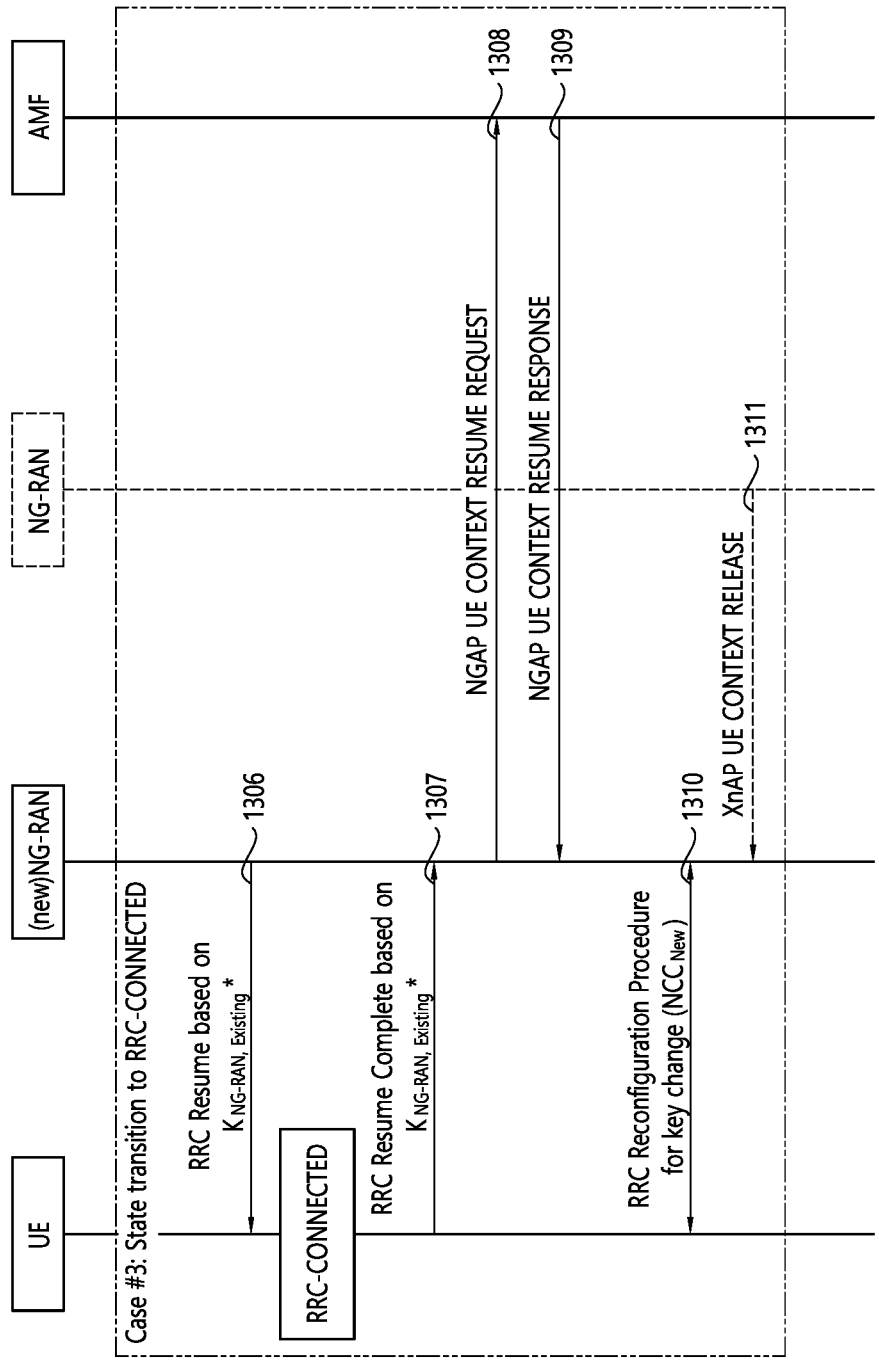

FIGS. 13A and 13B show an example method for handling security information between a wireless device and a network for a fast RRC release procedure according to the embodiment 2 of the present disclosure. In particular, FIGS. 13A and 13B show a diagram of the next resume case (i.e., state transition to RRC-CONNECTED) after the procedure in FIG. 11 is performed.

In step 1300, the UE may be in the RRC-IDLE with suspend. In this case, the UE may store the AS context and suspend all SRBs and DRBs. Since the procedure in FIG. 11 is already performed prior to the beginning of this procedure, the last serving NG-RAN may store the {$NH_{New}$, $NCC_{New}$} pair for next resume/handover and {$NH_{Existing}$, $NCC_{Existing}$} pair for EDT, respectively.

In step 1301, upon connection resumption request for Mobile Originated data from the upper layers, the UE may initiate the early data transmission procedure and select a random access preamble configured for EDT.

In step 1302, the UE may send an RRC Resume Request message to the NG-RAN to resume the RRC connection. The RRC Resume Request message may include its Resume ID (or I-RNTI), the establishment cause, and authentication token. The Resume ID (or I-RNTI) is used by the NG-RAN to access the stored information required to resume the RRC connection. The authentication token (e.g., Short MAC-I) is used to allow the NG-RAN to verify the UE identity.

For EDT, the UL data may be also transmitted on DTCH multiplexed with this message on CCCH. This UL data may be ciphered by the UP key $K_{UPenc}$ from newly derived $K_{NG-RAN}*$ based on the existing unused {$NH_{Existing}$, $NCC_{Existing}$} pair.

In step 1303, on receiving the message from the UE, the NG-RAN may check firstly whether it is able to find the UE context or not. If not, the new NG-RAN may resolve the NG-RAN identity contained in the Resume ID (or I-RNTI), and send the XnAP RETRIEVE UE CONTEXT message to get the UE context from the last serving NG-RAN. In order to indicate to the last serving NG-RAN that the EDT for UL data is triggered, the new NG-RAN may include the EDT indication.

The last serving NG-RAN may calculate and verify the authentication token (e.g., Short MAC-I). If the check of the authentication token is successful, then last serving NG-RAN may derive a new $K_{NG\text{-}RAN,\ Existing}*$ from the existing unused $NH_{Existing}$.

For example, the new NG-RAN may send to the last serving NG-RAN the RRC Establishment Cause set to 'EDT' instead of the EDT indication.

For example, when the new NG-RAN does not include the EDT indication or RRC Establishment Cause set to 'EDT', the last serving NG-RAN may derive two new $K_{NG\text{-}RAN}*$ values (i.e., $K_{NG\text{-}RAN,\ Existing}*$ from the existing unused $NH_{Existing}$ and $K_{NG\text{-}RAN,\ New}*$ from the new fresh $NH_{New}$).

In step 1304, the last serving NG-RAN may send to the new NG-RAN the XnAP RETRIEVE UE CONTEXT RESPONSE message including the new derived $K_{NG\text{-}RAN,\ Existing}*$, the $NCC_{Existing}$ associated to the $K_{NG\text{-}RAN,\ Existing}*$, and $NCC_{New}$. The new NG-RAN can be aware that the current security key is derived from the existing unused $NH_{Existing}$ for EDT, and the $NCC_{New}$ should be used for the state transition to RRC-CONNTECTED.

In this case, the new NG-RAN may become the serving NG-RAN.

For example, when the new NG-RAN does not include the EDT indication or RRC Establishment Cause set to 'EDT', it may also include $K_{NG\text{-}RAN,\ New}*$ into the XnAP RETRIEVE UE CONTEXT RESPONSE message.

In step 1305, the serving NG-RAN may derive new AS keys (RRC integrity key, RRC encryption key and UP keys) corresponding to the algorithms from the received $K_{NG\text{-}RAN,\ Existing}*$. Then, the NG-RAN may decipher the UL EDT data by using the newly derived $K_{UPenc}$, and forwards it to UPF.

In step 1306, when the NG-RAN decides the state transition to RRC-CONNECTED for the UE, the NG-RAN may send the RRC Resume message to the UE. This message may be integrity protected in PDCP layer using the new AS keys based on the $K_{NG\text{-}RAN,\ Existing}*$.

On receiving the RRC Resume message from the NG-RAN, the UE may enter into the RRC-CONNECTED.

If the NG-RAN does not decide the state transition to RRC-CONNECTED for the UE, the procedure in FIGS. 12A and 12B show could be performed.

In step 1307, the UE may respond with the RRC Resume Complete message to the NG-RAN. This message may be integrity protected in PDCP layer using the new AS keys based on the $K_{NG\text{-}RAN,\ Existing}*$.

In step 1308, the NG-RAN may initiate the UE Context Resume procedure by sending the NGAP UE CONTEXT RESUME REQUEST message to the AMF.

If the Retrieve UE Context procedure is performed in step 1303, the NGAP PATH SWITCH REQUEST message may be used instead of the NGAP UE CONTEXT RESUME REQUEST message.

The AMF may compute new fresh $\{NH_{Update}, NCC_{Update}\}$ pair. For each of the PDU Sessions indicated in step 1304, the AMF may invoke Nsmf_PDUSession_UpdateSMContext Request. The session management function (SMF) may initiate an N4 Session Modification procedure indicating the resume of AN tunnel. The user plane function (UPF) may send N4 Session Modification Response to acknowledge the SMF request. The SMF sends Nsmf_PDU-Session_UpdateSMContext response to the AMF.

In step 1309, the AMF may respond with the NGAP UE CONTEXT RESUME RESPONSE message to the NG-RAN. If computation of new fresh $\{NH_{Update}, NCC_{Update}\}$ pair is performed in step 1308, the AMF may also include this pair into the message.

If the Retrieve UE Context procedure is performed in step 1303, the NGAP PATH SWITCH REQUEST ACK message may be used instead of the NGAP UE CONTEXT RESUME RESPONSE message.

In step 1310, the NG-RAN may initiate the RRC Reconfiguration procedure for key change with $NCC_{New}$. If the new fresh $\{NH_{Update}, NCC_{Update}\}$ pair is received in step 1309, the $NCC_{Update}$ could be included instead of $NCC_{New}$.

For example, if the embodiment 4, which will be described, is also applied to this procedure, the UE may update the security key based on the NCC value sent in the RRC Resume message in step 1306.

In step 1311, if the Retrieve UE Context procedure is performed in step 1303, the NG-RAN may trigger the release of the UE resources at the last serving NG-RAN.

According to the embodiment 2 of the present disclosure, the NG-RAN could derive a different security key according to the resume case. In addition, a new key derivation is possible for the resume and/or handover, whereas the UL EDT data can be deciphered at the NG-RAN.

Embodiment 3

Hereinafter, the embodiment 3 of the present disclosure will be described with reference to FIGS. 14 to 16.

In order to avoid security key mismatch between a wireless device and a network, the embodiment 3 of the present disclosure is that the AMF derives the new fresh $\{NH, NCC\}$ pair for the fast release case and sends it to the NG-RAN. Then, the NG-RAN stores the new fresh $\{NH, NCC\}$ pair for next resume and/or handover case. In addition, the NG-RAN disables the early data transmission. Therefore, for the next resume with EDT, the NG-RAN disallows the early data transmission. However, since the NG-RAN has a valid UE context, it can resume the RRC connection instead of the setup of a new RRC connection.

Figure 14:
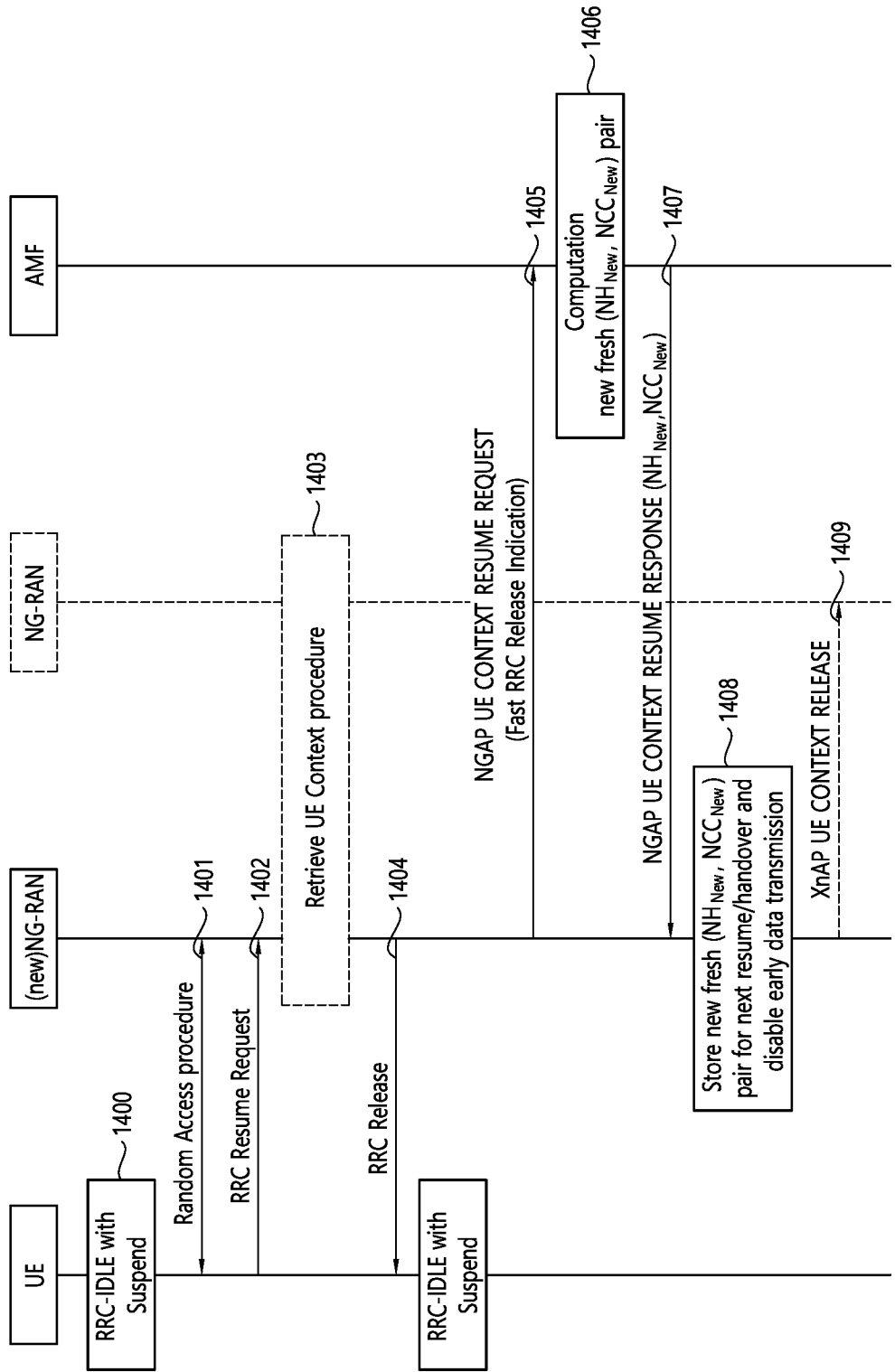
FIG. 14 shows an example method for handling security information between a wireless device and a network for a fast RRC release procedure according to the embodiment 3 of the present disclosure.

FIG. 14 shows an example method for handling security information between a wireless device and a network for a fast RRC release procedure according to the embodiment 3 of the present disclosure. In particular, FIG. 14 shows a diagram of the first fast RRC release case to avoid security key mismatch between a UE and an NG-RAN.

In step 1400, the UE may be in the RRC-IDLE with suspend. In this case, the UE may store the AS context, suspend all SRBs and DRBs.

In step 1401, at some later point in time (e.g. when the UE is being paged or when new data arrives in the uplink buffer), the UE may decide to resume the connection, and then initiates the Random Access procedure. This step may be performed for UL EDT.

In step 1402, the UE may send an RRC Resume Request message to the NG-RAN to resume the RRC connection. The RRC Resume Request message may include its Resume ID (or I-RNTI), the establishment cause, and authentication token. The Resume ID (or I-RNTI) is used by the NG-RAN to access the stored information required to resume the RRC connection. The authentication token (e.g., Short MAC-I) is used to allow the NG-RAN to verify the UE identity.

For EDT, the UL data may be transmitted on DTCH multiplexed with this message on CCCH.

In step 1403, on receiving the message from the UE, the NG-RAN may check firstly whether it is able to find the UE context or not. If not, the new NG-RAN may resolve the NG-RAN identity contained in the Resume ID (or I-RNTI), and initiate the XnAP Retrieve UE Context procedure to get the UE context from the last serving NG-RAN. In this case, the new NG-RAN may become the serving NG-RAN.

If the UL data is received in step 1402, the NG-RAN may decipher the data, and then forward it to UPF.

In step 1404, if the NG-RAN decides to trigger the fast RRC release, the NG-RAN may send the RRC Release message with suspend indication to the UE.

On receiving the RRC Release message with suspend indication from the NG-RAN, the UE may store the AS context, suspend all SRBs and DRBs, and enter to the RRC-IDLE with suspend.

In step 1405, the NG-RAN may send to the AMF the NGAP UE CONTEXT RESUME REQUEST message. If the NG-RAN decides to trigger the fast RRC release in step 1404, this message may include the Fast RRC Release Indication, which is used to indicate to the AMF that the UE now returns into the RRC-IDLE with suspend immediately.

If the Retrieve UE Context procedure is performed in step 1403, the NGAP PATH SWITCH REQUEST message may be used instead of the NGAP UE CONTEXT RESUME REQUEST message.

In step 1406, the AMF may compute new fresh $\{NH_{New}, NCC_{New}\}$ pair. When the Fast RRC Release Indication is received in step 1405, the AMF may restart the Periodic Registration Timer.

In step 1407, the AMF may respond with the NGAP UE CONTEXT RESUME RESPONSE message including new fresh $\{NH_{New}, NCC_{New}\}$ pair to the NG-RAN.

If the Retrieve UE Context procedure is performed in step 1403, the NGAP PATH SWITCH REQUEST ACK message may be used instead of the NGAP UE CONTEXT RESUME RESPONSE message.

In step 1408, the NG-RAN may store the fresh $\{NH_{New}, NCC_{New}\}$ pair for next resume and/or handover. In addition, the NG-RAN may disable the early data transmission to avoid the security key mismatch between the UE and NG-RAN.

In step 1409, if the Retrieve UE Context procedure is performed in step 1403, the NG-RAN may trigger the release of the UE resources at the last serving NG-RAN.

Figure 15:
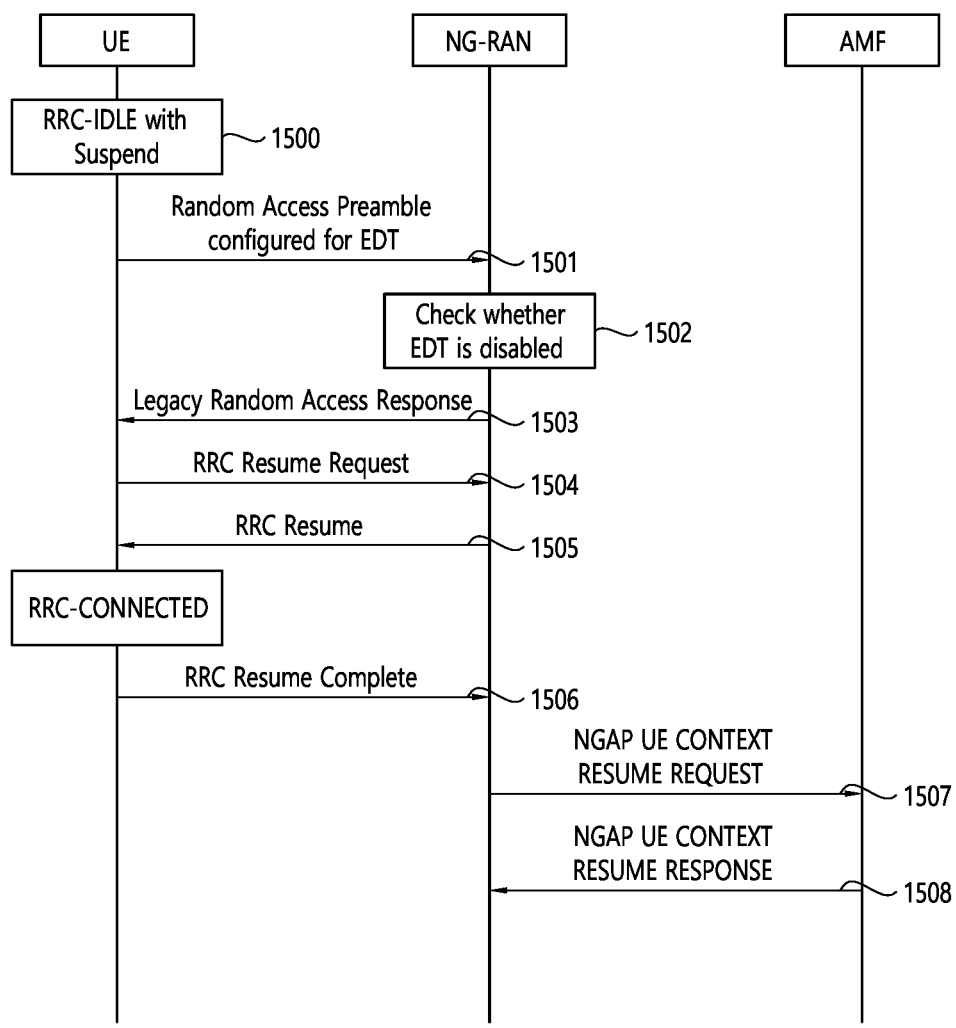
FIG. 15 shows an example method for handling security information between a wireless device and a network for a fast RRC release procedure according to the embodiment 3 of the present disclosure.

FIG. 15 shows an example method for handling security information between a wireless device and a network for a fast RRC release procedure according to the embodiment 3 of the present disclosure. In particular, FIG. 15 shows a diagram of next resume case when UE accesses to last serving NG-RAN, after the procedure in FIG. 14 is performed.

In step 1500, the UE may be in the RRC-IDLE with suspend. In this case, the UE may store the AS context, suspend all SRBs and DRBs. Since the procedure in FIG. 14 is already performed prior to the beginning of this procedure, the last serving NG-RAN may store the $\{NH_{New}, NCC_{New}\}$ pair for next resume and/or handover and may disable the early data transmission.

In step 1501, upon connection resumption request for Mobile Originated data from the upper layers, the UE may initiate the early data transmission procedure and select a random access preamble configured for EDT.

In this case, the UE may access to the last serving NG-RAN where the connection was suspended.

In step 1502, the NG-RAN may check whether the EDT is disabled or not.

In step 1503, since the EDT is disabled, the NG-RAN may send to the UE the Random Access Response message for normal resume.

In step 1504, the UE may send an RRC Resume Request message to the NG-RAN to resume the RRC connection. The RRC Resume Request message may include its Resume ID (or I-RNTI), the establishment cause, and authentication token. The Resume ID (or I-RNTI) is used by the NG-RAN to access the stored information required to resume the RRC connection. The authentication token (e.g., Short MAC-I) is used to allow the NG-RAN to verify the UE identity.

The UL EDT data may not be contained in this message.

In step 1505, on receiving the message from the UE, the NG-RAN may check firstly whether it is able to find the UE context or not. If yes, the NG-RAN may respond with an RRC Resume message. The message may include the $NCC_{New}$ value which is required in order to re-establish the AS security.

On receiving the RRC Resume message from the NG-RAN, then the UE may check if the received NCC value is different from the current NCC value stored in the UE itself. Since the NCC values differ, then the UE may need to synchronize its locally kept NH. The UE may calculate a new $K_{NG\text{-}RAN, New}^*$ from the new NH (since a new NCC value was received). The UE may perform then further derivation of the AS keys (RRC integrity key, RRC encryption key and UP keys) from the new derived $K_{NG\text{-}RAN, New}^*$. The UE may check the integrity of the RRC Resume message by verifying the MAC-I. If the verification of the MAC-I is successful, the UE may enter into the RRC-CONNECTED.

In step 1506, the UE may send the RRC Resume Complete message both integrity protected and ciphered to the NG-RAN on SRB1.

In step 1507, The NG-RAN may initiate the UE Context Resume procedure by sending the NGAP UE CONTEXT RESUME REQUEST message to the AMF.

The AMF may compute new fresh $\{NH_{Update}, NCC_{Update}\}$ pair. For each of the PDU Sessions indicated in step 1504, the AMF may invoke Nsmf_PDUSession_UpdateSMContext Request. The SMF may initiate an N4 Session Modification procedure indicating the resume of AN tunnel. The UPF may send N4 Session Modification Response to acknowledge the SMF request. The SMF may send Nsmf_PDUSession_UpdateSMContext response to the AMF.

In step 1508, the AMF may respond with the NGAP UE CONTEXT RESUME RESPONSE message to the NG-RAN. If computation of new fresh $\{NH_{Update}, NCC_{Update}\}$ pair is performed in step 1507, the AMF may also include this pair into the message.

On receiving the new fresh {NHUpdate, NCCUpdate} pair from the AMF, the NG-RAN may store it for next resume and/or handover.

Figure 16:
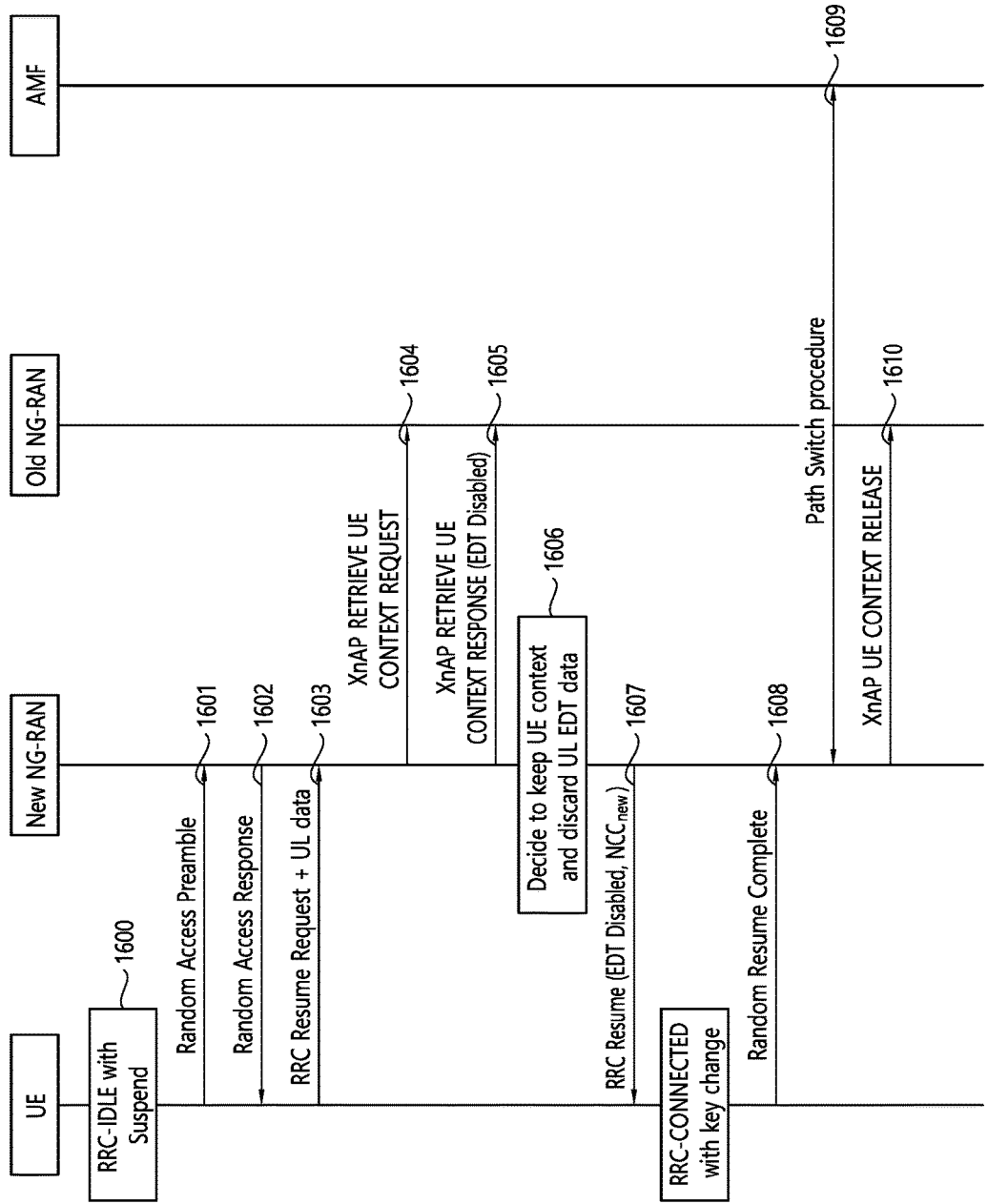
FIG. 16 shows an example method for handling security information between a wireless device and a network for a fast RRC release procedure according to the embodiment 3 of the present disclosure.

FIG. 16 shows an example method for handling security information between a wireless device and a network for a fast RRC release procedure according to the embodiment 3 of the present disclosure. In particular, FIG. 16 shows a diagram of the next resume case when UE accesses to the new NG-RAN, after the procedure in FIG. 14 is performed.

In step 1600, the UE may be in the RRC-IDLE with suspend. In this case, the UE may store the AS context, suspend all SRBs and DRBs. Since the procedure in FIG. 14 is already performed prior to the beginning of this procedure, the last serving NG-RAN may store the {$NH_{New}$, $NCC_{New}$} pair for next resume and/or handover and may disable the early data transmission.

In step 1601, upon connection resumption request for Mobile Originated data from the upper layers, the UE may initiate the early data transmission procedure and select a random access preamble configured for EDT.

In this case, the UE may access to the new NG-RAN different from the one where the connection was suspended (i.e., the last serving NG-RAN).

In step 1602, the NG-RAN may respond with the Random Access Response message to the UE.

In step 1603, the UE may send an RRC Resume Request message to the NG-RAN to resume the RRC connection. The RRC Resume Request message may include its Resume ID (or I-RNTI), the establishment cause, and authentication token. The Resume ID (or I-RNTI) is used by the NG-RAN to access the stored information required to resume the RRC connection. The authentication token (e.g., Short MAC-I) is used to allow the NG-RAN to verify the UE identity.

For EDT, the UL data may also be transmitted on DTCH multiplexed with this message on CCCH. This UL data may be ciphered by the UP key $K_{UPenc}$ from newly derived $K_{NG-RAN}*$ based on the existing unused {$NH_{Existing}$, $NCC_{Existing}$} pair.

In step 1604, on receiving the message from the UE, the NG-RAN may check firstly whether it is able to find the UE context or not. If not, the new NG-RAN may resolve the NG-RAN identity contained in the Resume ID (or I-RNTI), and send the XnAP RETRIEVE UE CONTEXT message to get the UE context from the last serving NG-RAN.

The last serving NG-RAN may check whether the EDT is disabled or not.

In step 1605, the last serving NG-RAN may send to the new NG-RAN the XnAP RETRIEVE UE CONTEXT RESPONSE message including the EDT Disabled indication. The new NG-RAN could be aware that the EDT is disabled because of the security key mismatch.

The new NG-RAN may become the serving NG-RAN now.

In step 1606, since the check of the authentication token is valid, the NG-RAN may decide to keep the UE context and resume the RRC connection instead of the setup of a new RRC connection. Since the EDT is disabled, the NG-RAN also discards the UL EDT data from the UE.

In step 1607, when the NG-RAN decides to keep the UE context and to transit to RRC-CONNECTED for the UE, the NG-RAN may send the RRC Resume message to the UE. This message may be integrity protected in PDCP layer using the new AS keys based on the $K_{NG-RAN, New}*$. In addition, since the UE still has existing $NH_{Existing}$, the EDT Disabled indication and the $NCC_{New}$ value are included into the message to update the security key of the UE from the existing unused {$NH_{Existing}$, $NCC_{Existing}$} pair to the new fresh {$NH_{New}$, $NCC_{New}$} pair.

Based on the EDT Disabled indication, the UE can be aware that the EDT is disabled by the NG-RAN and the UL EDT data is discarded. From this indication, the UE can also know that it needs to synchronize its locally kept $NH_{Existing}$. Based on the $NCC_{New}$ value, the UE may perform a new NH derivation. The UE may calculate a new $K_{NG-RAN, New}*$ from the new NH (since a new NCC value was received). The UE may perform then further derivation of the AS keys (RRC integrity key, RRC encryption key and UP keys) from the new derived $K_{NG-RAN, New}*$. The UE may check the integrity of the RRC Resume message by verifying the MAC-I. If the verification of the MAC-I is successful, the UE may enter into the RRC-CONNECTED.

In step 1608, the UE may respond with the RRC Resume Complete message to the NG-RAN. This message may be integrity protected in PDCP layer using the new AS keys based on the $K_{NG-RAN, New}*$. Since the UL EDT data is discarded in step 1606, the UE may send again the UL data to the NG-RAN.

In step 1609, the NG-RAN may initiate the Path Switch procedure by sending the NGAP PATH SWITCH REQUEST message to the AMF.

The AMF may compute new fresh {$NH_{Update}$, $NCC_{Update}$} pair, and then sends it to the NG-RAN. For each of the PDU Sessions indicated in step 1604, the AMF may invoke Nsmf_PDUSession_UpdateSMContext Request. The SMF may initiate an N4 Session Modification procedure indicating the resume of AN tunnel. The UPF may send N4 Session Modification Response to acknowledge the SMF request. The SMF may send Nsmf_PDUSession_UpdateSMContext response to the AMF.

The UL data from the UE may be forwarded to the UPF.

In step 1610, the NG-RAN may trigger the release of the UE resources at the last serving NG-RAN.

For example, the procedure in FIG. 16 could be applied to the case where the UE accesses to the last serving NG-RAN after the first fast RRC release is performed. In this case, the single NG-RAN may perform the roles of both the new and last serving NG-RAN.

According to the embodiment 3 of the present disclosure, when a wireless device accesses to the last serving NG-RAN, the NG-RAN could reject the UE-triggered EDT procedure as soon as possible. Therefore, the unnecessary retransmission of the UL EDT data could be avoided.

According to the embodiment 3 of the present disclosure, when the UE accesses to the new NG-RAN, the NG-RAN could use the stored UE context and synchronize the security key between the UE and NG-RAN. Therefore, the setup of a new RRC connection could be avoided. In addition, signalling exchange between the UE and NG-RAN could be reduced.

Embodiment 4

Hereinafter, the embodiment 4 of the present disclosure will be described with reference to FIG. 17.

In order to avoid security key mismatch between a UE and an NG-RAN, the embodiment 4 of the present disclosure is that the NG-RAN fails to decipher the UL EDT data of the wireless device, but it does not setup a new RRC connection for the UE. Since the NG-RAN already has a valid UE context, it decides to keep the UE context and resume the RRC connection. However, since the UE and the NG-RAN have different {NH, NCC} pair, the NG-RAN sends the new fresh {NH, NCC} pair to the UE by using the RRC Resume message. The additional indication is also included to inform that the UE should change the security key according to the NCC value sent in the RRC Resume message and the UL EDT data should be retransmitted.

Figure 17:
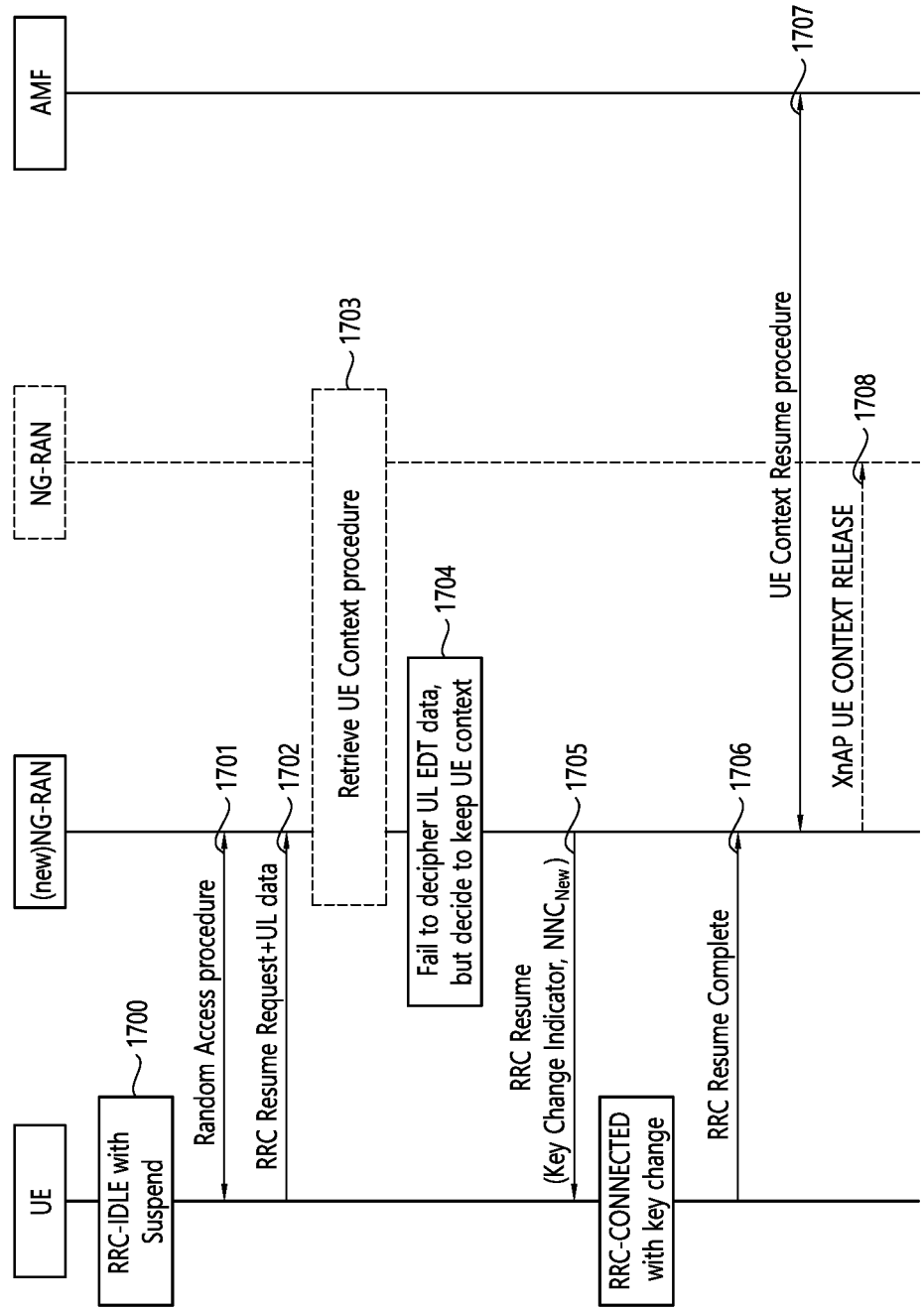
FIG. 17 shows an example method for handling security information between a wireless device and a network for a fast RRC release procedure according to the embodiment 4 of the present disclosure.

FIG. 17 shows an example method for handling security information between a wireless device and a network for a fast RRC release procedure according to the embodiment 4 of the present disclosure. In particular, FIG. 17 shows a diagram of the next resume case, after the fast RRC release procedure in FIG. 8 is performed.

In step 1700, the UE may be in the RRC-IDLE with suspend. In this case, the UE may store the AS context, suspend all SRBs and DRBs. Since the fast RRC release in FIG. 8 is already performed prior to the beginning of this procedure, the UE and the last serving NG-RAN have different {NH, NCC} pair.

In step 1701, upon connection resumption request for Mobile Originated data from the upper layers, the UE may initiate the early data transmission procedure and select a random access preamble configured for EDT.

In step 1702, the UE may send an RRC Resume Request message to the NG-RAN to resume the RRC connection. The UE may include its Resume ID (or I-RNTI), the establishment cause, and authentication token. The Resume ID (or I-RNTI) is used by the NG-RAN to access the stored information required to resume the RRC connection. The authentication token (e.g., Short MAC-I) is used to allow the NG-RAN to verify the UE identity.

For EDT, the UL data may be also transmitted on DTCH multiplexed with this message on CCCH. This UL data may be ciphered by the UP key $K_{UPenc, Existing}$ from newly derived $K_{NG-RAN, Existing}*$ based on the existing unused {$NH_{Existing}$, $NCC_{Existing}$} pair.

In step 1703, on receiving the message from the UE, the NG-RAN may check firstly whether it is able to find the UE context or not. If not, the new NG-RAN may resolve the NG-RAN identity contained in the Resume ID (or I-RNTI), and initiate the Retrieve UE Context procedure to get the UE context from the last serving NG-RAN.

The last serving NG-RAN may calculate and verify the authentication token (e.g., Short MAC-I). If the check of the authentication token is successful, then last serving NG-RAN derives a new $K_{NG-RAN, New}*$ based on the new fresh $NH_{New}$ received from AMF, and then sends it with the UE context to the new NG-RAN by using the XnAP RETRIEVE UE CONTEXT RESPONSE message.

In this case, the new NG-RAN may become the serving NG-RAN.

In step 1704, the NG-RAN may derive new AS keys (RRC integrity key, RRC encryption key and UP keys) corresponding to the algorithms from the received $K_{NG-RAN, New}*$. Then, the NG-RAN may try to decipher the UL EDT data by using the newly derived $K_{UPenc, New}$. However, since the UP key used by the UE (i.e., $K_{UPenc, Existing}$) is different from the one by the NG-RAN (i.e., $K_{UPenc, New}$), the NG-RAN may fail to decipher the UL EDT data for the UE.

Since the check of the authentication token is valid, the NG-RAN may decide to keep the UE context and resume the RRC connection instead of the setup of a new RRC connection. Since the EDT is failed, the NG-RAN may also discard the UL EDT data from the UE.

In step 1705, when the NG-RAN decides to keep the UE context and to transit to RRC-CONNECTED for the UE, it may send the RRC Resume message to the UE. This message may be integrity protected in PDCP layer using the new AS keys based on the $K_{NG-RAN, New}*$. In addition, since the UE still has existing $NH_{Existing}$, the Key Change Indicator and the $NCC_{New}$ value may be included in the RRC Resume message to update the security key of the UE from the existing unused {$NH_{Existing}$, $NCC_{Existing}$} pair to the new fresh {$NH_{New}$, $NCC_{New}$} pair.

Based on the Key Change Indicator, the UE can be aware that the EDT is failed at the NG-RAN and the UL EDT data is discarded. From this indicator, the UE can also know that it needs to synchronize its locally kept $NH_{Existing}$. Based on the $NCC_{New}$ value, the UE may perform a new NH derivation. The UE may calculate a new $K_{NG-RAN, New}*$ from the new NH (since a new NCC value was received). The UE may perform then further derivation of the AS keys (RRC integrity key, RRC encryption key and UP keys) from the new derived $K_{NG-RAN, New}*$. The UE may check the integrity of the RRC Resume message by verifying the MAC-I. If the verification of the MAC-I is successful, the UE may enter into the RRC-CONNECTED.

In step 1706, the UE may respond with the RRC Resume Complete message to the NG-RAN. This message may be integrity protected in PDCP layer using the new AS keys based on the $K_{NG-RAN, New}*$. Since the UL EDT data may be discarded in step 1706, the UE again may send the UL data to the NG-RAN.

In step 1707, the NG-RAN may initiate the UE Context Resume procedure. If the Retrieve UE Context procedure is performed in step 1703, the Path Switch procedure may be used instead of the UE Context Resume procedure.

The AMF may compute new fresh {$NH_{Update}$, $NCC_{Update}$} pair and may send it to the NG-RAN. For each of the PDU Sessions indicated in step 1704, the AMF may invoke Nsmf_PDUSession_UpdateSMContext Request. The SMF may initiate an N4 Session Modification procedure indicating the resume of AN tunnel. The UPF may send N4 Session Modification Response to acknowledge the SMF request. The SMF may send Nsmf_PDUSession_UpdateSMContext response to the AMF.

The UL data from the UE may be forwarded to the UPF.

In step 1708, if the Retrieve UE Context procedure is performed in step 1703, the NG-RAN may trigger the release of the UE resources at the last serving NG-RAN.

According to the embodiment 4 of the present disclosure, the NG-RAN may use the stored UE context and synchronize the security key between the UE and NG-RAN. Since the setup of a new RRC connection is avoided, signalling exchange between the UE and NG-RAN could be reduced.

Embodiment 5

Hereinafter, the embodiment 5 of the present disclosure will be described with reference to FIG. 18.

In order to avoid security key mismatch between the UE and NG-RAN, the embodiment 5 of the present disclosure is that when the NG-RAN decides to trigger the fast RRC release, the NG-RAN disables the early data transmission. Then, the NG-RAN indicates to the UE that the EDT is disabled by using the RRC Release message. From this indication, the UE only initiates the RRC Resume procedure without considering the EDT.

Figure 18:
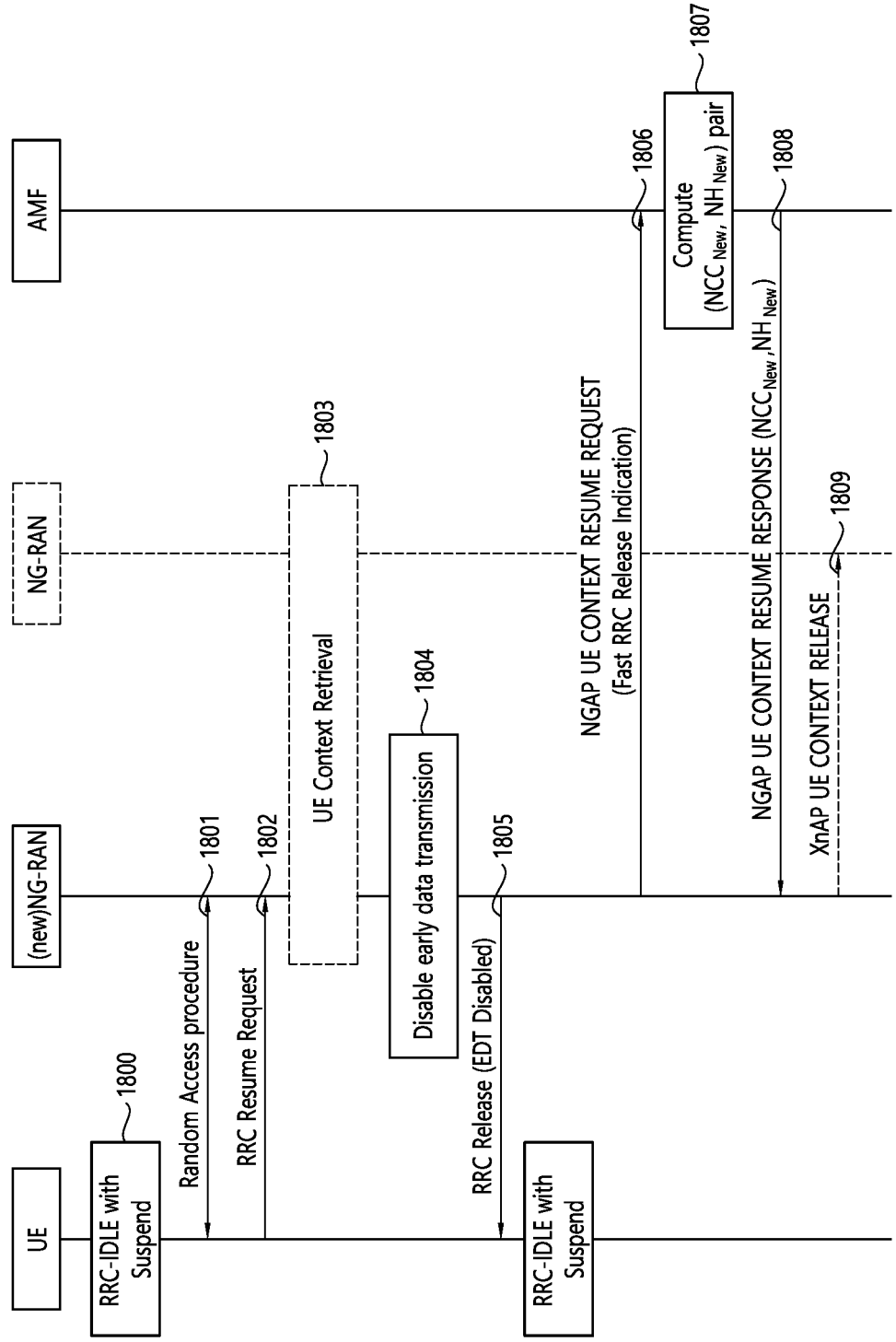
FIG. 18 shows an example method for handling security information between a wireless device and a network for a fast RRC release procedure according to the embodiment 5 of the present disclosure.

FIG. 18 shows an example method for handling security information between a wireless device and a network for a fast RRC release procedure according to the embodiment 5 of the present disclosure.

In step 1800, the UE may be in the RRC-IDLE with suspend. In this case, the UE may store the AS context, suspend all SRBs and DRBs.

In step 1801, at some later point in time (e.g. when the UE is being paged or when new data arrives in the uplink buffer), the UE may decide to resume the connection, and may initiate the Random Access procedure. This step may be performed for UL EDT.

In step 1802, the UE may send an RRC Resume Request message to the NG-RAN to resume the RRC connection. The RRC Resume Request message may include its Resume ID (or I-RNTI), the establishment cause, and authentication token. The Resume ID (or I-RNTI) is used by the NG-RAN to access the stored information required to resume the RRC connection. The authentication token (e.g., Short MAC-I) is used to allow the NG-RAN to verify the UE identity.

For EDT, the UL data may be transmitted on DTCH multiplexed with this message on CCCH.

In step 1803, on receiving the message from the UE, the NG-RAN may check firstly whether it is able to find the UE context or not. If not, the new NG-RAN may resolve the NG-RAN identity contained in the Resume ID (or I-RNTI), and may initiate the XnAP Retrieve UE Context procedure to get the UE context from the last serving NG-RAN. In this case, the new NG-RAN may become the serving NG-RAN.

If the UL data is received in step 1802, the NG-RAN may decipher the data, and then forwards it to UPF.

In step 1804, The NG-RAN may decide whether to trigger the fast RRC release. If yes, the NG-RAN may disable the early data transmission to avoid the security key mismatch between the UE and NG-RAN.

In step 1805, if the NG-RAN decides to trigger the fast RRC release in step 1804, the NG-RAN may send the RRC Release message with suspend indication to the UE. This message may also include the EDT Disabled indication, which indicates to the UE that the EDT is disabled by the NG-RAN.

When the UE receives the RRC Release message with suspend indication from the NG-RAN, the UE may store the AS context, suspend all SRBs and DRBs, and enter to the RRC-IDLE with suspend.

For example, instead of the EDT Disabled indication, the NG-RAN may not include the NCC value to disallow the EDT in next resume.

In step 1806, the NG-RAN may send to the AMF the NGAP UE CONTEXT RESUME REQUEST message. If the NG-RAN decides to trigger the fast RRC release in step 1804, this message may include the Fast RRC Release Indication, which is used to indicate to the AMF that the UE now returns into the RRC-IDLE with suspend immediately.

If the Retrieve UE Context procedure is performed in step 1803, the NGAP PATH SWITCH REQUEST message may be used instead of the NGAP UE CONTEXT RESUME REQUEST message.

In step 1807, when the Fast RRC Release Indication is received in step 1805, the AMF may restart the Periodic Registration Timer, and may compute new fresh $\{NH_{New}, NCC_{New}\}$ pair.

In step 1808, the AMF may respond with the NGAP UE CONTEXT RESUME RESPONSE message including new fresh $\{NH_{New}, NCC_{New}\}$ pair to the NG-RAN.

If the Retrieve UE Context procedure is performed in step 1803, the NGAP PATH SWITCH REQUEST ACK message may be used instead of the NGAP UE CONTEXT RESUME RESPONSE message.

The NG-RAN may store the fresh $\{NH_{New}, NCC_{New}\}$ pair for next resume and/or handover.

In step 1809, if the Retrieve UE Context procedure is performed in step 1803, the NG-RAN may trigger the release of the UE resources at the last serving NG-RAN.

According to some embodiments of the present disclosure, when the NG-RAN releases the RRC connection without the EDT Disabled indication in next resume, the UE may be able to initiate the EDT procedure again.

According to the embodiment 5 of the present disclosure, when the fast RRC release is triggered, the NG-RAN may disallow the UE to trigger the EDT procedure. Therefore, unnecessary UL transmission could be avoided.

Embodiment 6

Hereinafter, the embodiment 6 of the present disclosure will be described with reference to FIG. 19.

In order to avoid security key mismatch between the UE and NG-RAN, the embodiment 6 of the present disclosure is that when the NG-RAN decides to suspend the RRC connection, the AMF indicates to the NG-RAN that a vertical key derivation is required at next resume. From this indication, the NG-RAN disables the fast RRC release. For the next resume, the NG-RAN allows the UE to release the RRC connection after NGAP signalling or to transit to RRC-CONNECTED.

Figure 19:
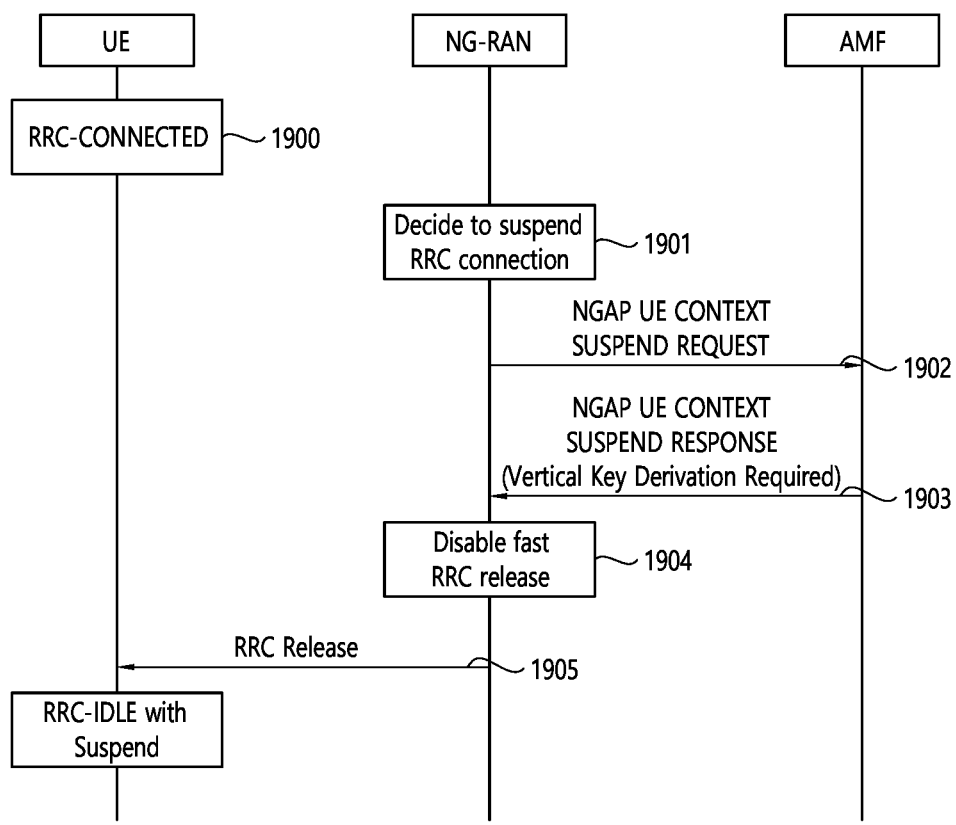
FIG. 19 shows an example method for handling security information between a wireless device and a network for a fast RRC release procedure according to the embodiment 6 of the present disclosure.

FIG. 19 shows an example method for handling security information between a wireless device and a network for a fast RRC release procedure according to the embodiment 6 of the present disclosure.

In step 1900, the UE may be in the RRC-CONNECTED.

In step 1901, due to some triggers, e.g. the expiry of a UE inactivity timer, the NG-RAN may decide to suspend the RRC connection.

In step 1902, the NG-RAN may initiate the NGAP UE Context Suspend procedure to inform the AMF that the RRC connection is being suspended. The AMF may request the SMF to release all NG connections for the UE.

In step 1903, the AMF responds to the NG-RAN with the NGAP UE CONTEXT SUSPEND RESPONSE message including the Vertical Key Derivation Required indication, which informs that a new NH derivation is needed at the AMF.

For example, the Vertical Key Derivation Required indication could be also sent to the NG-RAN by using the Path Switch procedure, Initial Context Setup procedure, or UE Context Modification procedure.

In step 1904, on receiving the message from the AMF, the NG-RAN may disable the fast RRC release. Therefore, if the UE accesses to the NG-RAN for the resume, the NG-RAN should disallow the fast RRC release for the UE.

In step 1905, the NG-RAN sends the RRC Release message with suspend indication to the UE.

On receiving the RRC Release message with suspend indication from the NG-RAN, the UE may store the AS context, suspend all SRBs and DRBs, and enter to the RRC-IDLE with suspend.

According to the embodiment 6 of the present disclosure, the NG-RAN can determine whether to trigger the fast RRC release or not, according to the security request from the AMF. Therefore, security key mismatch between the UE and NG-RAN could be avoided.

Embodiment 7

Hereinafter, the embodiment 7 of the present disclosure will be described with reference to FIGS. 20 and 21.

In order to avoid security key mismatch between the UE and NG-RAN, the embodiment 7 of the present disclosure is that when the UE remains in the RRC-CONNECTED, the AMF informs the NG-RAN of the security policy related to a NH derivation for UP CIoT 5GS optimization. Based on the security policy from the AMF, the NG-RAN can decide whether to trigger the fast RRC release or not.

Figure 20:
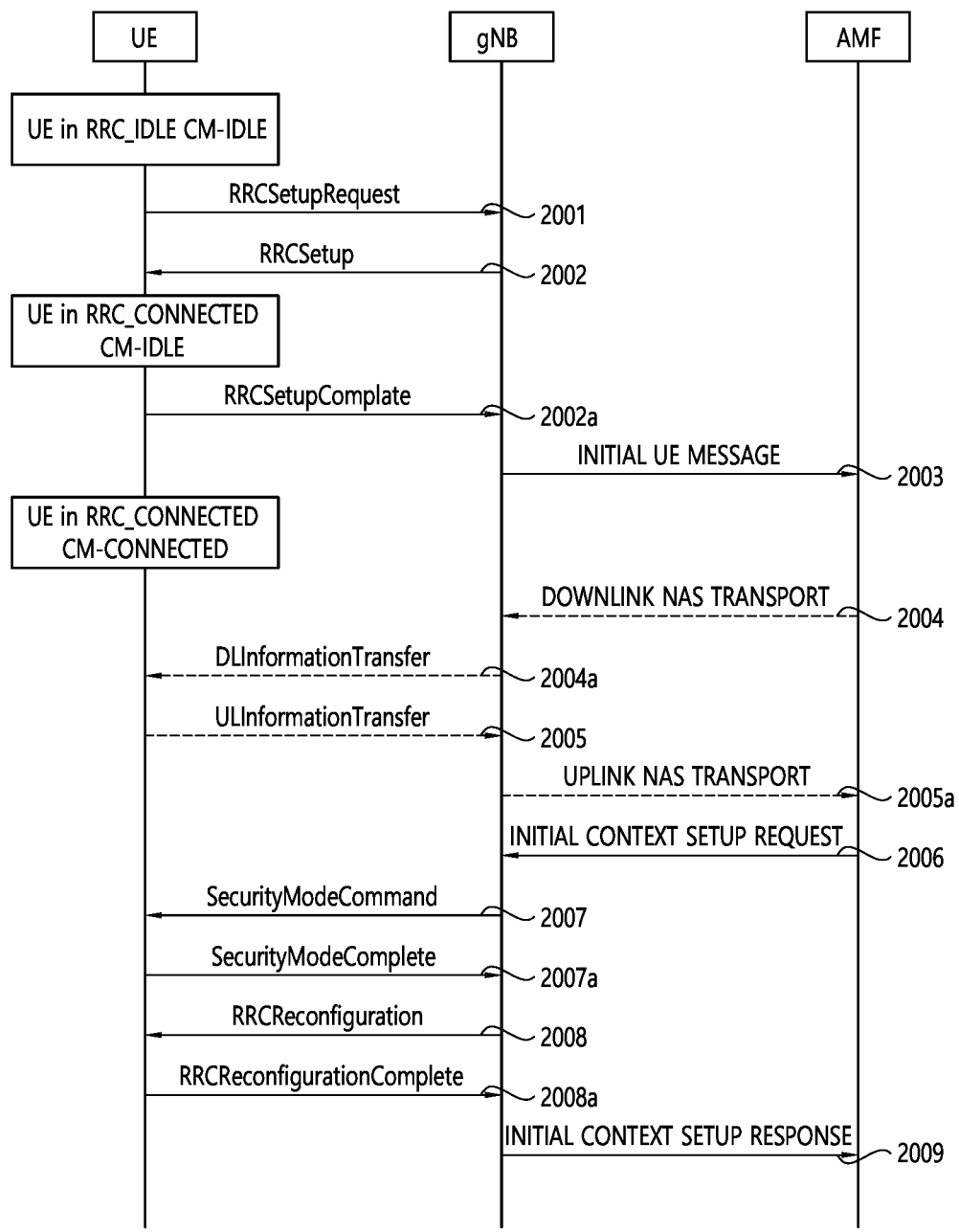
FIG. 20 shows an example method for UE triggered transition from RRC_IDLE to RRC_CONNECTED to which the technical features of the present disclosure can be applied.

FIG. 20 shows an example method for UE triggered transition from RRC_IDLE to RRC_CONNECTED to which the technical features of the present disclosure can be applied. Section 9.2.1.3 of 3GPP TS 38.300 V15.6.0 (2019-06) may be referred.

In step 2001, the UE requests to setup a new connection from RRC_IDLE.

In steps 2002 or 2002a, the gNB completes the RRC setup procedure.

For example, the scenario where the gNB rejects the request is described below.

In step 2003, the first NAS message from the UE, piggybacked in RRCSetupComplete, is sent to AMF.

In steps 2004, 2004a, 2005, and 2005a, Additional NAS messages may be exchanged between UE and AMF.

In step 2006, the AMF prepares the UE context data (including PDU session context, the Security Key, UE Radio Capability and UE Security Capabilities, etc.) and sends it to the gNB.

In steps 2007 and 2007a, the gNB activates the AS security with the UE.

In steps 2008 and 2008a, the gNB performs the reconfiguration to setup SRB2 and DRBs.

In step 2009, the gNB informs the AMF that the setup procedure is completed.

According to some embodiments of the present disclosure, RRC messages in step 2001 and 2002 use SRBO, all the subsequent messages use SRB1. Messages in steps 2007 and 2007a are integrity protected. From step 2008 on, all the messages are integrity protected and ciphered.

According to some embodiments of the present disclosure, for signalling only connection, step 2008 is skipped since SRB2 and DRBs are not setup.

Figure 21:
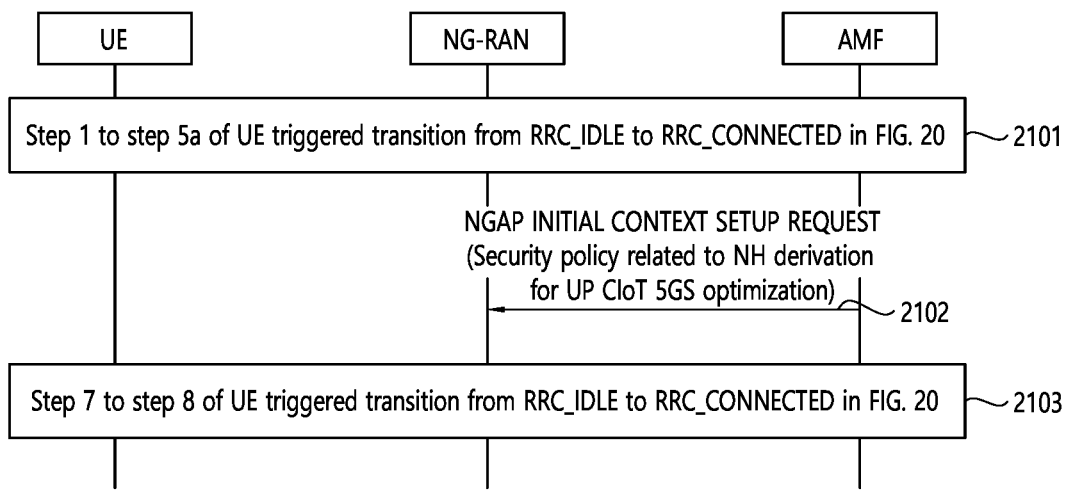
FIG. 21 shows an example method for handling security information between a wireless device and a network for a fast RRC release procedure according to the embodiment 7 of the present disclosure.

FIG. 21 shows an example method for handling security information between a wireless device and a network for a fast RRC release procedure according to the embodiment 7 of the present disclosure.

In step 2101, for the state transition to RRC-CONNECTED, steps 2001 to 2005a of UE in FIG. 20 may be performed.

In step 2102, the AMF may prepare the UE context data (including PDU session context, the Security Key, UE Radio Capability and UE Security Capabilities, etc.) and may send it to the NG-RAN by using the NGAP INITIAL CONTEXT SETUP REQUEST message. This message may also include the Security policy related to NH derivation for UP CIoT 5GS optimization. Based on the security policy from the AMF, the NG-RAN can decide whether to trigger the fast RRC release or not. For example, if the security policy is set to "vertical key derivation always required", the NG-RAN may disable the fast RRC release. If the security policy is set to "vertical key derivation skipped during fast RRC release", the NG-RAN can trigger the fast RRC release.

According to some embodiments of the present disclosure, the Security policy related to NH derivation for UP CIoT 5GS optimization can be also sent to the NG-RAN by using the Path Switch procedure, UE Context Suspend procedure, or UE Context Modification procedure.

In step 2103, Steps 2007 to 2008 in FIG. 20 may be performed.

According to the embodiment 7 of the present disclosure, the NG-RAN could decide whether to trigger the fast RRC release or not according to the security policy from the AMF. Therefore, security key mismatch between the UE and NG-RAN could be avoided.

Figure 22:
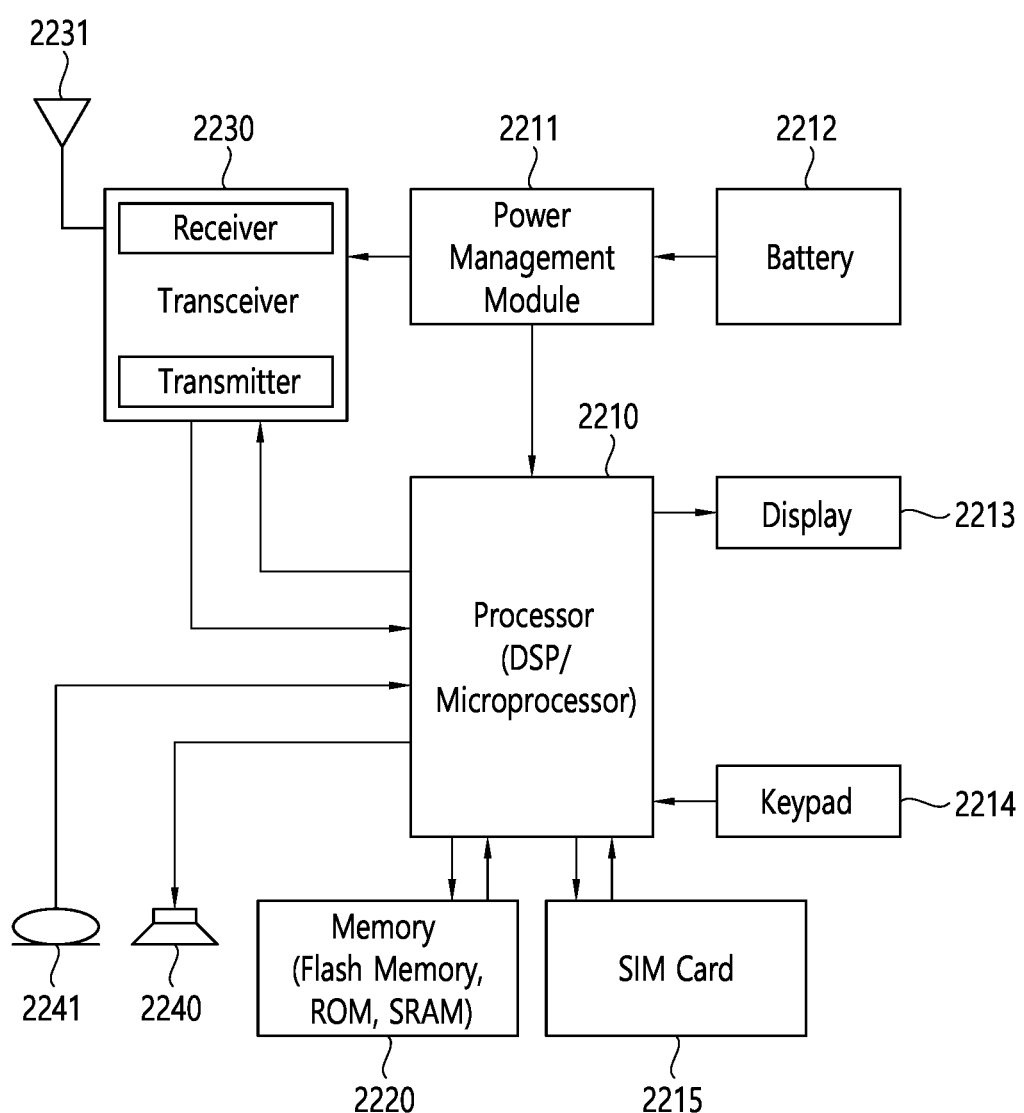
FIG. 22 shows an apparatus to which the technical features of the present disclosure can be applied.

FIG. 22 shows an apparatus to which the technical features of the present disclosure can be applied. The detailed description of the same features as those described above will be simplified or omitted.

An apparatus may be referred to as a wireless device, such as a user equipment (UE), an Integrated Access and Backhaul (IAB), or etc.

A wireless device includes a processor 2210, a power management module 2211, a battery 2212, a display 2213, a keypad 2214, a subscriber identification module (SIM) card 2215, a memory 2220, a transceiver 2230, one or more antennas 2231, a speaker 2240, and a microphone 2241.

The processor 2210 may be configured to implement proposed functions, procedures and/or methods described in this description. Layers of the radio interface protocol may be implemented in the processor 2210. The processor 2210 may include application-specific integrated circuit (ASIC), other chipset, logic circuit and/or data processing device. The processor 2210 may be an application processor (AP). The processor 2210 may include at least one of a digital signal processor (DSP), a central processing unit (CPU), a graphics processing unit (GPU), a modem (modulator and demodulator). An example of the processor 2210 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 2211 manages power for the processor 2210 and/or the transceiver 2230. The battery 2212 supplies power to the power management module 2211. The display 2213 outputs results processed by the processor 2210. The keypad 2214 receives inputs to be used by the processor 2210. The keypad 2214 may be shown on the display 2213. The SIM card 2215 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 2220 is operatively coupled with the processor 2210 and stores a variety of information to operate the processor 2210. The memory 2220 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 2220 and executed by the processor 2210. The memory 2220 can be implemented within the processor 2210 or external to the processor 2210 in which case those can be communicatively coupled to the processor 2210 via various means as is known in the art.

The transceiver 2230 is operatively coupled with the processor 2210, and transmits and/or receives a radio signal. The transceiver 2230 includes a transmitter and a receiver. The transceiver 2230 may include baseband circuitry to process radio frequency signals. The transceiver 2230 controls the one or more antennas 2231 to transmit and/or receive a radio signal.

The speaker 2240 outputs sound-related results processed by the processor 2210. The microphone 2241 receives sound-related inputs to be used by the processor 2210.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 23:
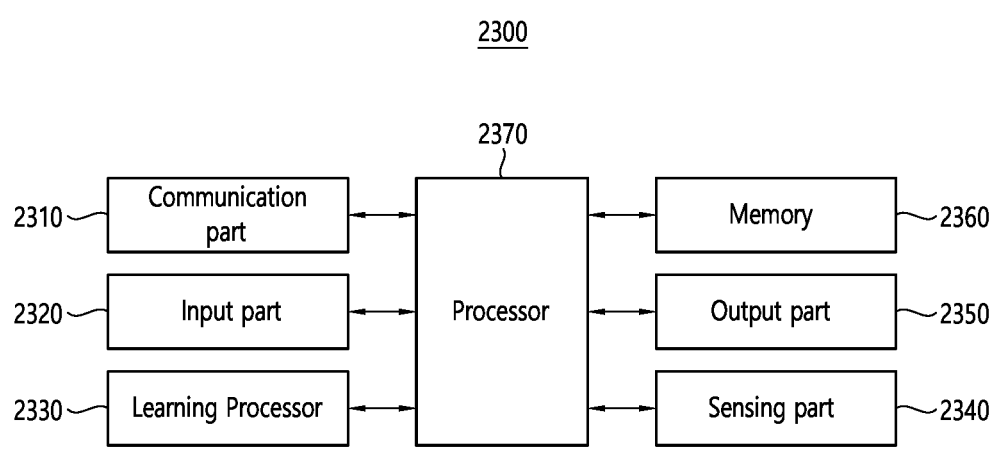
FIG. 23 shows an example of an AI device to which the technical features of the present disclosure can be applied.

FIG. 23 shows an example of an AI device to which the technical features of the present disclosure can be applied.

The AI device 2300 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 23, the AI device 2300 may include a communication part 2310, an input part 2320, a learning processor 2330, a sensing part 2340, an output part 2350, a memory 2360, and a processor 2370.

The communication part 2310 can transmit and/or receive data to and/or from external devices such as the AI devices and the AI server using wire and/or wireless communication technology. For example, the communication part 2310 can transmit and/or receive sensor information, a user input, a learning model, and a control signal with external devices. The communication technology used by the communication part 2310 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2320 can acquire various kinds of data. The input part 2320 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 2320 can acquire input data to be used when acquiring an output using learning data and a learning model for model learning. The input part 2320 may obtain raw input data, in which case the processor 2370 or the learning processor 2330 may extract input features by preprocessing the input data.

The learning processor 2330 may learn a model composed of an ANN using learning data. The learned ANN can be referred to as a learning model. The learning model can be used to infer result values for new input data rather than learning data, and the inferred values can be used as a basis for determining which actions to perform. The learning processor 2330 may perform AI processing together with the learning processor of the AI server. The learning processor 2330 may include a memory integrated and/or implemented in the AI device 2300. Alternatively, the learning processor 2330 may be implemented using the memory 2360, an external memory directly coupled to the AI device 2300, and/or a memory maintained in an external device.

The sensing part 2340 may acquire at least one of internal information of the AI device 2300, environment information of the AI device 2300, and/or the user information using various sensors. The sensors included in the sensing part 2340 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2350 may generate an output related to visual, auditory, tactile, etc. The output part 2350 may include a display unit for outputting visual information, a speaker for outputting auditory information, and/or a haptic module for outputting tactile information.

The memory 2360 may store data that supports various functions of the AI device 2300. For example, the memory 2360 may store input data acquired by the input part 2320, learning data, a learning model, a learning history, etc.

The processor 2370 may determine at least one executable operation of the AI device 2300 based on information determined and/or generated using a data analysis algorithm and/or a machine learning algorithm. The processor 2370 may then control the components of the AI device 2300 to perform the determined operation. The processor 2370 may request, retrieve, receive, and/or utilize data in the learning processor 2330 and/or the memory 2360, and may control the components of the AI device 2300 to execute the predicted operation and/or the operation determined to be desirable among the at least one executable operation. The processor 2370 may generate a control signal for controlling the external device, and may transmit the generated control signal to the external device, when the external device needs to be linked to perform the determined operation. The processor 2370 may obtain the intention information for the user input and determine the user's requirements based on the obtained intention information. The processor 2370 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2330 and/or learned by the learning processor of the AI server, and/or learned by their distributed processing. The processor 2370 may collect history information including the operation contents of the AI device 2300 and/or the user's feedback on the operation, etc. The processor 2370 may store the collected history information in the memory 2360 and/or the learning processor 2330, and/or transmit to an external device such as the AI server. The collected history information can be used to update the learning model. The processor 2370 may control at least some of the components of AI device 2300 to drive an application program stored in memory 2360. Furthermore, the processor 2370 may operate two or more of the components included in the AI device 2300 in combination with each other for driving the application program.

Figure 24:
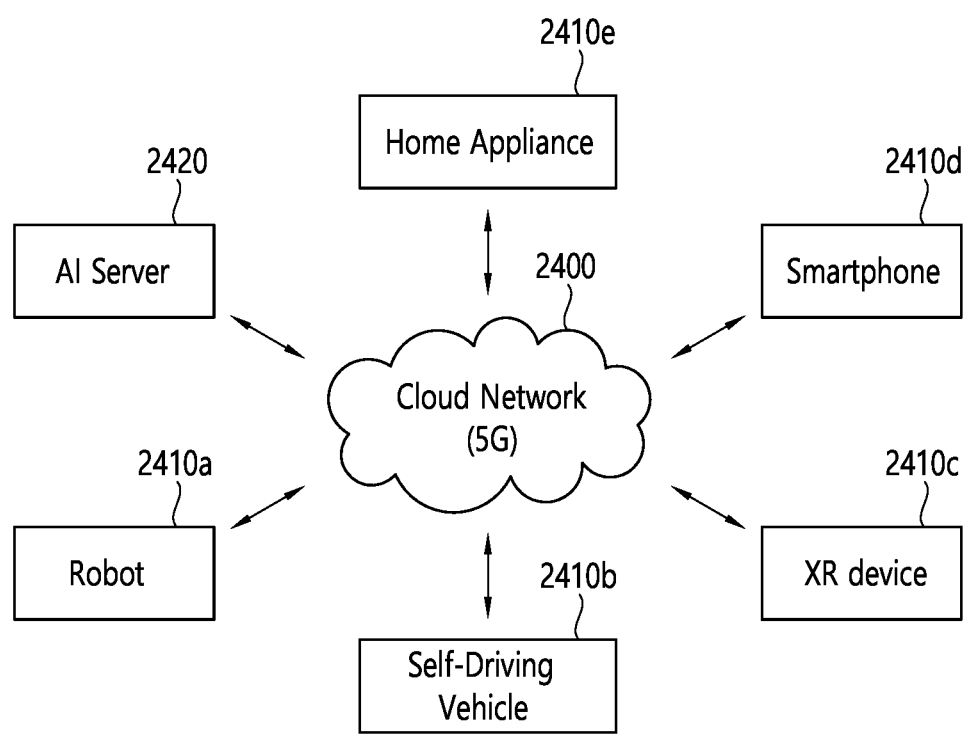
FIG. 24 shows an example of an AI system to which the technical features of the present disclosure can be applied.

FIG. 24 shows an example of an AI system to which the technical features of the present disclosure can be applied.

Referring to FIG. 24, in the AI system, at least one of an AI server 2420, a robot 2410a, an autonomous vehicle 2410b, an XR device 2410c, a smartphone 2410d and/or a home appliance 2410e is connected to a cloud network 2400.

The robot 2410a, the autonomous vehicle 2410b, the XR device 2410c, the smartphone 2410d, and/or the home appliance 2410e to which the AI technology is applied may be referred to as AI devices 2410a to 2410e.

The cloud network 2400 may refer to a network that forms part of a cloud computing infrastructure and/or resides in a cloud computing infrastructure. The cloud network 2400 may be configured using a 3G network, a 4G or LTE network, and/or a 5G network. That is, each of the devices 2410a to 2410e and 2420 consisting the AI system may be connected to each other through the cloud network 2400. In particular, each of the devices 2410a to 2410e and 2420 may communicate with each other through a base station, but may directly communicate with each other without using a base station.

The AI server 2420 may include a server for performing AI processing and a server for performing operations on big data. The AI server 2420 is connected to at least one or more of AI devices constituting the AI system, i.e. the robot 2410a, the autonomous vehicle 2410b, the XR device 2410c, the smartphone 2410d and/or the home appliance 2410e through the cloud network 2400, and may assist at least some AI processing of the connected AI devices 2410a to 2410e. The AI server 2420 can learn the ANN according to the machine learning algorithm on behalf of the AI devices 2410a to 2410e, and can directly store the learning models and/or transmit them to the AI devices 2410a to 2410e. The AI server 2420 may receive the input data from the AI devices 2410a to 2410e, infer the result value with respect to the received input data using the learning model, generate a response and/or a control command based on the inferred result value, and transmit the generated data to the AI devices 2410a to 2410e. Alternatively, the AI devices 2410a to 2410e may directly infer result value for the input data using a learning model, and generate a response and/or a control command based on the inferred result value.

Various embodiments of the AI devices 2410a to 2410e to which the technical features of the present disclosure can be applied will be described. The AI devices 2410a to 2410e shown in FIG. 24 can be seen as specific embodiments of the AI device 2300 shown in FIG. 23.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a core network node in a wireless communication system, the method comprising:
receiving, from a radio access network node, a context resume request message including a fast Radio Resource Control release indication, wherein the fast radio resource control release indication informs the core network node that the radio access network node transmits a radio resource control release message to a wireless device before the core network node receives the context resume request message;
determining to stop computation of new security information for the wireless device based on the fast radio resource control release indication; and
transmitting a context resume response message to the radio access network node.

2. The method of claim 1, wherein the wireless device and the radio access network node have old security information which is generated before stopping the computation of the new security information.

3. The method of claim 2, wherein the radio access network node verifies uplink data, from the wireless device, based on the old security information.

4. The method of claim 2, wherein the old security information includes an old Next Hop (NH) and/or an old NH Chaining Count (NCC).

5. The method of claim 1, wherein the new security information includes a new Next Hop (NH) and/or a new NH Chaining Count (NCC).

6. The method of claim 1, wherein the method further comprises, starting a Periodic Registration Timer upon receiving the fast radio resource control release indication.

7. The method of claim 1, wherein the method further comprises, receiving, from the radio access network node, an NGAP PATH SWITCH REQUEST message instead of the context resume request message, wherein the fast radio resource control release indication is included in the NGAP PATH SWITCH REQUEST message.

8. The method of claim 1, wherein the method further comprises, transmitting, to the radio access network node, an NGAP PATH SWITCH REQUEST ACK instead of the context resume response message.

9. The method of claim 1, wherein the core network node is an access and mobility management function (AMF) and the radio access network node is a next generation Node B (gNB).

10. The method of claim 1, wherein the core network node is a mobility management entity (MME) and the radio access network node is an evolved Node B (eNB).

11. The method of claim 1, wherein the wireless device is an autonomous driving apparatus in communication with at least one of a mobile terminal, a network, and/or autonomous vehicles other than the wireless device.

12. A method performed by a radio access network node in a wireless communication system, the method comprising:
transmitting, to a wireless device, old security information;
transmitting, to a core network node, a context resume request message including a fast radio resource control release indication after transmitting a radio resource control release message to the wireless device;
receiving uplink data from the wireless device; and
verifying the uplink data based on the old security information,
wherein the core network node stops computation of new security information for the wireless device based on the fast radio resource control release indication, wherein the new security information is different from the old security information.

13. The method of claim 12, wherein the old security information is included in the radio resource control release message.

14. The method of claim 12, wherein the uplink data is transmitted, from the wireless device, by an early data transmission (EDT) procedure, while the wireless device is on radio resource control IDLE with suspend.

* * * * *